United States Patent
Madaras et al.

(10) Patent No.: US 7,449,500 B2
(45) Date of Patent: *Nov. 11, 2008

(54) INK JET INK CONTAINING MULTIMETALLIC POLYMERIC COLORANTS

(75) Inventors: Mihaela L. Madaras, Webster, NY (US); Steven Evans, Rochester, NY (US); Marcel B. Madaras, Webster, NY (US); David T. Southby, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 678 days.

This patent is subject to a terminal disclaimer.

(21) Appl. No.: 10/865,665

(22) Filed: Jun. 10, 2004

(65) Prior Publication Data

US 2005/0282926 A1 Dec. 22, 2005

(51) Int. Cl.
C08G 79/00 (2006.01)
C09B 45/00 (2006.01)
C09D 1/00 (2006.01)
C09D 4/00 (2006.01)
C09D 5/00 (2006.01)
C09D 11/00 (2006.01)
C09D 13/00 (2006.01)
C09K 3/00 (2006.01)

(52) U.S. Cl. .............. 523/160; 106/31.01; 106/31.13; 106/31.27; 106/31.5; 106/31.81; 523/161; 528/395; 534/698; 534/DIG. 3

(58) Field of Classification Search ............ 106/31.01, 106/31.13, 31.27, 31.5, 31.81; 523/160, 523/161; 528/395; 534/698, DIG. 3
See application file for complete search history.

(56) References Cited

U.S. PATENT DOCUMENTS 4,045,424 A * 8/1977 Tartter ................. 534/693
5,725,641 A 3/1998 MacLeod
5,980,622 A 11/1999 Byers
6,001,161 A 12/1999 Evans et al.
6,302,949 B1 * 10/2001 Peter ................. 106/31.52
7,119,178 B2 * 10/2006 Madaras et al. ............ 534/698
2001/0027734 A1 10/2001 Geisenberger et al.
2002/0139281 A1 10/2002 Stoffel et al.
2003/0088077 A1 5/2003 Yamada et al.
2003/0159616 A1 8/2003 Wang et al.
2003/0172839 A1 9/2003 Tyrell et al.

FOREIGN PATENT DOCUMENTS

| | | |
|---|---|---|
| EP | 1 284 200 | 2/2003 |
| GB | 2 372 750 | 9/2002 |
| WO | 2004/011560 | 2/2004 |
| WO | 2004/011561 | 2/2004 |
| WO | 2004/011562 | 2/2004 |

OTHER PUBLICATIONS

Vishwanath Banerjie, Arun K. Dey; Markromol. Chem.; Rapid Commun. 1; 41-46 (1980); "Polymeric Metallated Organic Pigments".
P. Gregory; "Metal Complexes As Specialty Dyes And Pigments"; Comprehensive Coordination Chemistry II—From Biology To Nanotechnology; Elsevier Ltd.; 2003; Chapter 9.12; pp. 549-579.
US Serial No. ; concurrently filed; titled "Ink Jet Ink Containing Multimetallic Polymeric Colorants"; of Mihaela L. Madaras et al.
US Serial No. ; concurrently filed; titled "Ink Jet Ink Containing Multimetallic Polymeric Colorants"; of Mihaela L. Madaras et al, Jun. 10. 2004.

* cited by examiner

*Primary Examiner*—Patrick D Niland
(74) *Attorney, Agent, or Firm*—Sarah Meeks Roberts; Arthur E. Kluegel

(57) ABSTRACT

The invention relates to an ink composition containing a multimetallic oligomeric or polymeric azo colorant wherein the colorant is derived from the polymerization reaction of a polyvalent metal cation with a dimeric tridentate ligand containing a coordinating azo group.

35 Claims, No Drawings

INK JET INK CONTAINING MULTIMETALLIC POLYMERIC COLORANTS

CROSS REFERENCE TO RELATED APPLICATIONS

This application relates to commonly assigned application Ser. No. 10/865,129, now U.S. Pat. 7,119,178, entitled "Multimetallic Polymeric Azo Colorants" and filed simultaneously herewith. This copending application is incorporated by reference herein for all that it contains.

FIELD OF THE INVENTION

The present invention relates to new colorants and their use in ink jet ink compositions.

BACKGROUND OF THE INVENTION

Ink jet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand ink jet, individual ink droplets are projected as needed onto the image-recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the image-recording element, while un-imaged droplets are caught and returned to an ink sump. Ink jet printers have found broad applications across markets ranging from desk-top document and photographic-quality imaging, to short run printing and industrial labeling.

The ink compositions used in various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. Commonly used carrier media include water, mixtures of water and water-miscible organic compounds, and high boiling organic solvents such as hydrocarbons, esters, ketones, etc. Most of the ink compositions used in today's ink jet printers contain water and water-miscible organic compounds.

Materials used in ink jet printing ink compositions must have the correct properties to provide ink compositions that are stable, possess good printing properties, and provide an image with good color, sharpness and image stability. Many colorants are known and used in ink jet printing ink compositions. Many have some or most of these desirable properties but it is very difficult to find a colorant that possesses all of the above properties. Colorants are degraded by ozone and light, and the extent of degradation can differ depending on the components of the ink composition as well as the recording element upon which they are printed. There is a great need to develop ink compositions which have high optical densities, superior lightfastness, and superior ozonefastness when printed on different types of recording elements, in particular, those that are fast drying or porous. It is difficult to find colorants that meet all of these requirements.

Metallic azo complexes are an important class of azo colorants that are commonly used in ink jet ink compositions. Metallic complexes of various azo dyes may be divided into two classes: metallized azo colorants in which the azo group does not participate in the complexation with the metal, i.e., is not a coordination site, and those in which the azo group is one of the coordination sites. The latter complexes have more commercial applications because they exhibit better lightfastness as compared to the former.

Metallic azo complexes can usually have different ratios between ligands and metal ions, e.g. 1:1, 2:1, and 3:1, etc. Also, depending on the number of coordination sites, ligands can be monodentate, bidentate, tridentate etc. Usually, the more coordination sites in a ligand, the better the chemical stability of the complex. For a comprehensive review on metal complex colorants, including metallized azo dyes and pigments see "Metal Complexes as Specialty Dyes and Pigments" by P. Gregory in *Comprehensive Coordination Chemistry II-From Biology to Nanotechnology* Elsevier Ltd., 2003; Chapter 9.12, pp549-579.

More recent examples of metallized azo dyes being used in inkjet inks are described in U.S. Pat. No. 6,001,161; U.S. Pat. No. 5,980,622; U.S. 2003/0088077 A1; U.S. 2003/0172839 A1; U.S. 2003/0159616 A1; U.S. 2002/0139281 A1; EP 1284200 A2; GB 2372750 A; WO 2004/011560 A2; WO 2004/011561 A1; WO 2004/011562 A1; U.S. Pat. No. 5,725,641; U.S. 2001/0027734 A1; U.S. Pat. No. 6,302,949 B1. In general, these dyes have excellent lightfastness and good color but the ozone fastness on fast drying or porous media is not as good as one would like.

There is still needed an inkjet ink composition with good lightfastness and color t that also has improved ozone stability.

SUMMARY OF THE INVENTION

This invention provides an ink jet ink composition containing a multimetallic oligomeric or polymeric azo colorant wherein the colorant is derived from the polymerization reaction of a polyvalent metal cation with a dimeric tridentate ligand containing a coordinating azo group. More specifically it provides an ink jet ink composition wherein the colorant is represented by formulae 1a, 2a, 3a, 1b, 2b, or 3b:

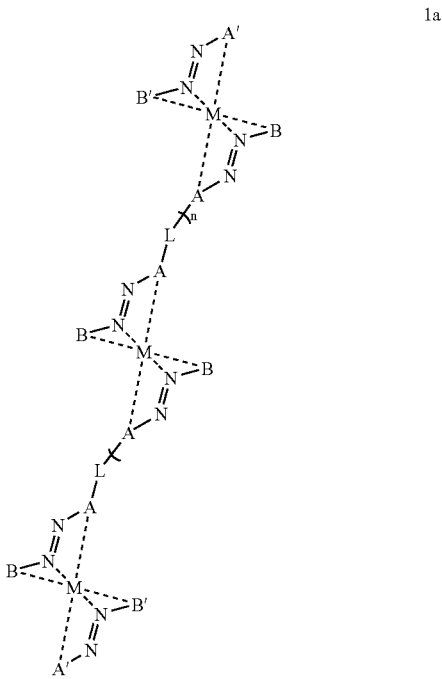

-continued

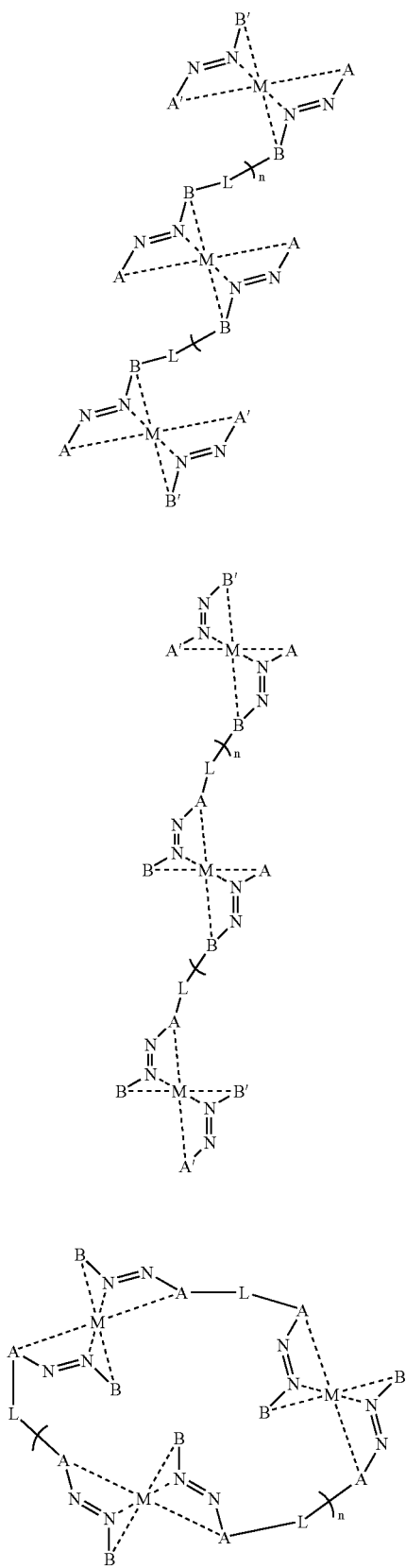

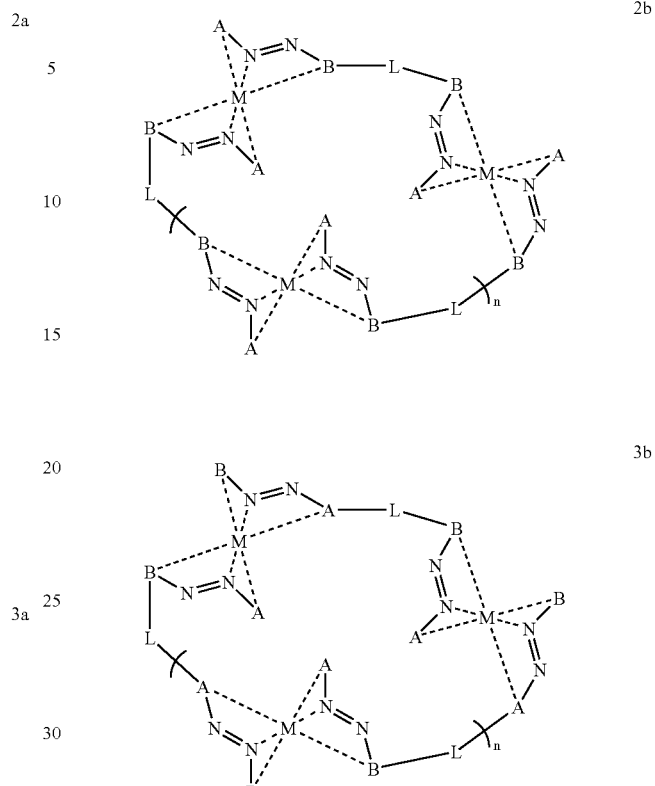

wherein A, A', B and B' independently comprise sites capable of forming a coordinate bond with a polyvalent metal ion, wherein the site is 2, 3 or 4 bonds away from the azo group; L is independently an unconjugated linking group chosen such that the colorants with formula A-N=N—B-L-B—N=N-A, B—N=N-A-L-A-N=N—B or A-N=N—B-L-A-N=N—B cannot form an intramolecular monomeric complex with the metal ion; M is a polyvalent transition metal ion; and n represents an integer from 0 to 2000.

The invention provides an ink jet ink composition having numerous advantages. The invention provides an ink jet ink composition having high optical densities, superior lightfastness, smear and bleeding resistance, and superior ozonefastness. The invention also provides an ink jet ink composition that exhibits the aforementioned properties when printed on different types of recording elements, in particular, those that are fast drying or porous.

DETAILED DESCRIPTION OF THE INVENTION

The dyes used in the invention are multimetallic oligomeric or polymeric colorants wherein said colorant is derived from the polymerization reaction of a polyvalent metal cation with a dimeric tridentate ligand containing a coordinating azo group. When an azo dye participates as a ligand in a 2:1 complex with a transition metal cation and if two ligand molecules are covalently bound such that an intramolecular complexation is not possible, they can, upon metallation, form a multimetallic polymeric azo structure. These multimetallic polymeric azo colorants may have a wide range of molecular weights, potentially controlled by a variety of conditions: e.g. solubility in the polymerization/metallation reaction mixture, the amounts of monomeric ligands added during metallation, rigidity of the covalent tether in the dimeric ligand, etc.
In one embodiment, the colorants are represented by the following formulae:
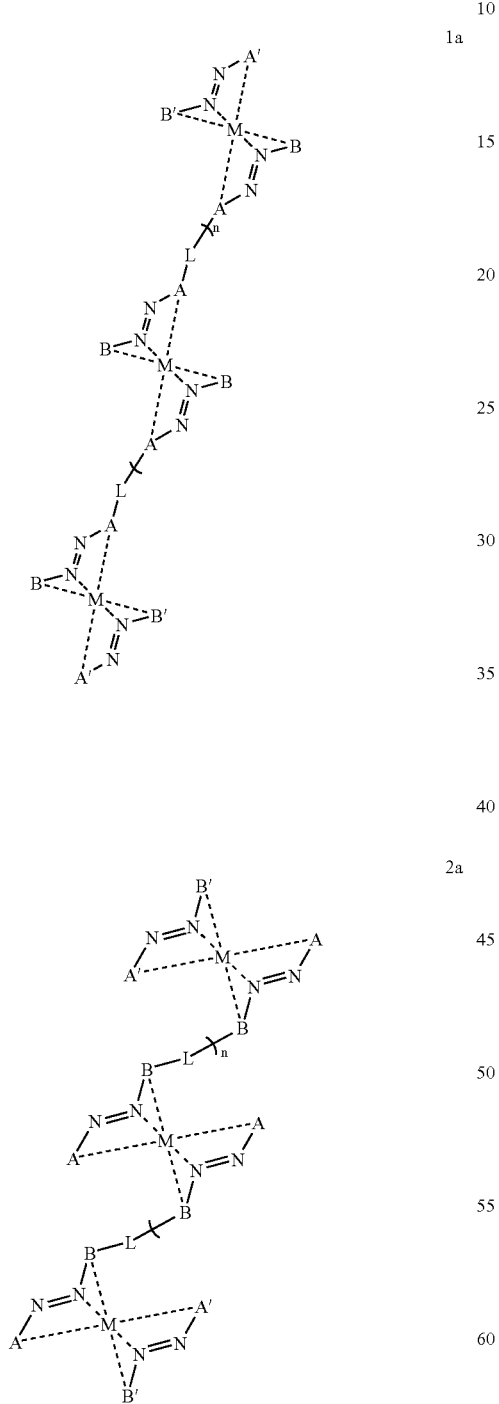
1a
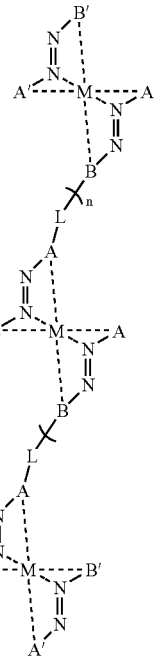
2a
-continued
3a
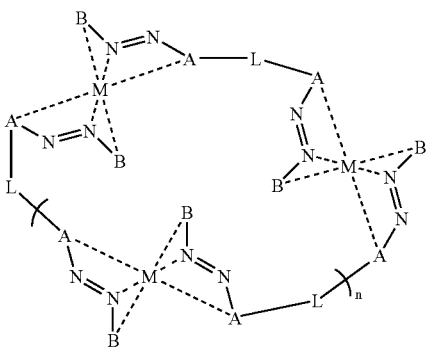
1b
2b
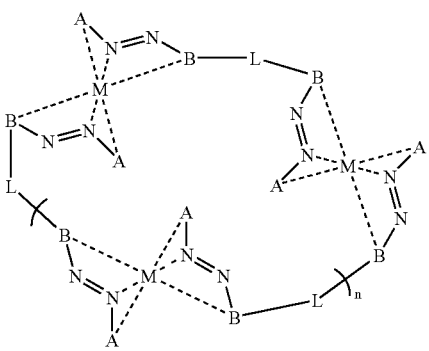

-continued

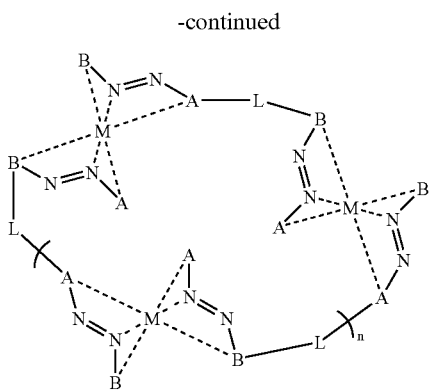

3b wherein A, A', B and B' independently comprise sites capable of forming a coordinate bond with a polyvalent metal ion, wherein the site is 2, 3 or 4 bonds away from the azo group; L is independently an unconjugated linking group chosen such that the colorants with formula A-N=N—B-L-B—N=N-A, B—N=N-A-L-A-N=N—B or A-N=N—B-L-A-N=N—B cannot form an intramolecular monomeric complex with the metal ion; M is a polyvalent transition metal ion; and n represents an integer from 0 to 2000.

A, A', B or B' may be independently represented by structure I or structure II:

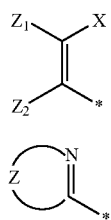

I

II wherein *denotes the bond to the azo group; X is a heteroatom or group of atoms containing a heteroatom capable of forming a coordinate bond with a polyvalent transition metal ion; $Z_1$ is independently H, a substituted or unsubstituted alkyl group, a substituted or unsubstituted aryl group, a substituted or unsubstituted hetaryl group, a substituted or unsubstituted alkoxy group, a substituted or unsubstituted aryloxy group, an amino group, a substituted or unsubstituted alkyl or dialkylamino group or a substituted or unsubstituted aryl or diarylamino group; $Z_2$ is independently the same as $Z_1$, a cyano or a nitro group, a substituted or unsubstituted alkyl or arylsulfonyl group, a substituted or unsubstituted alkoxy or aryloxycarbonyl group, a substituted or unsubstituted alkyl, dialkyl, aryl, diaryl or aralkylcarbamoyl group, a substituted or unsubstituted alkyl, dialkyl, aryl, diaryl or aralkylsulfamoyl group, a substituted or unsubstituted alkanoyl or substituted or unsubstituted aroyl group; $Z_1$ and $Z_2$ together may represent the atoms necessary to form a 5- to 7-membered alicyclic, aromatic or heteroaromatic ring; and/or $Z_1$ and X may be combined together to form a 5- to 7-membered alicyclic or heteroaromatic ring; and Z contains the atoms necessary to form a substituted or unsubstituted, fused or unfused heterocyclic ring;

In another embodiment, structure I is represented by the following formulae which may be substituted, in addition to the X group, with any other functional group that does not interfere with the action of the colorant:

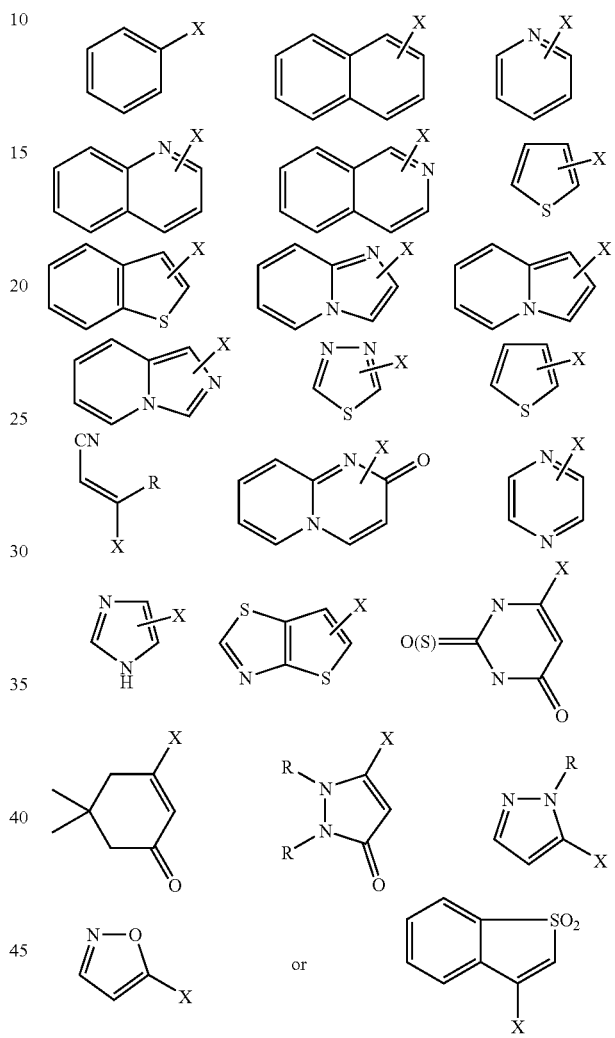

wherein X is a hydroxy, carboxy, amino, or imino group; an alkyl- or arylsulfonyl group; an alkyl- or arylsulfonamido group; a sulfamoyl group; an N-aryl- or N-alkylsulfamoyl group; an alkoxy- or aryloxycarbonyl group; an alkyl- or arylcarbonyl group; a sulfo group; or an aryloxy or alkoxy group; and R is a substituted or unsubstituted aryl or alkyl group.

In another embodiment of the invention, structure I is represented by the following formulae:

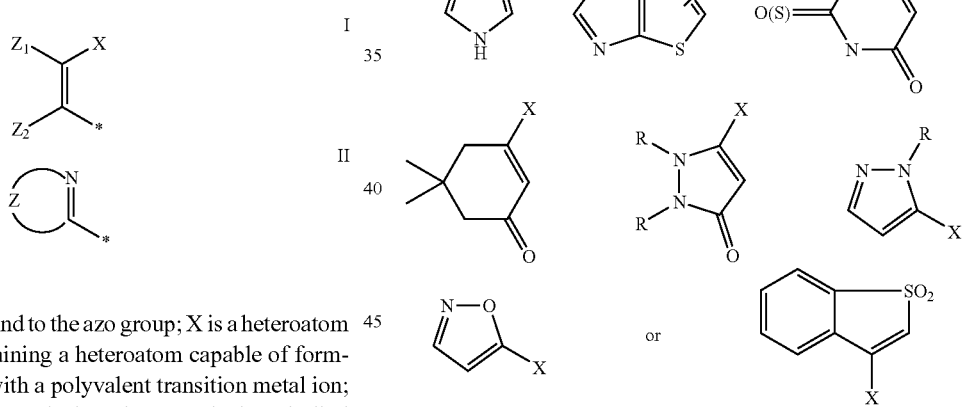

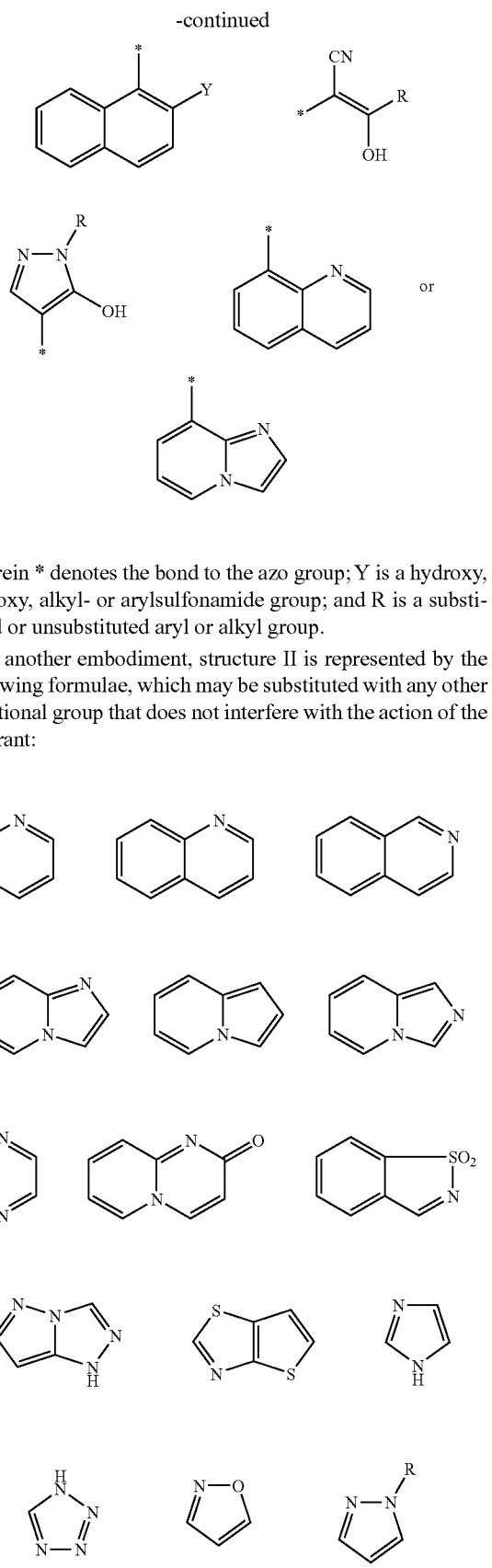

wherein * denotes the bond to the azo group; Y is a hydroxy, carboxy, alkyl- or arylsulfonamide group; and R is a substituted or unsubstituted aryl or alkyl group.

In another embodiment, structure II is represented by the following formulae, which may be substituted with any other functional group that does not interfere with the action of the colorant:

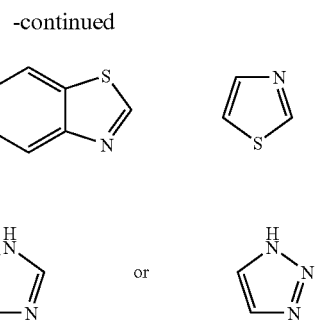

Preferable formulae for structure II are:

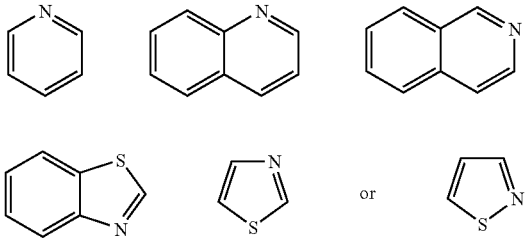

In a preferred embodiment of the invention, the multimetallic polymeric azo colorants have formulae 1a, 2a, 3a, 1b, 2b, or 2c wherein any one of A, A', B or B' is independently represented by any of the aforementioned formulae for structures I and II. Preferably A and A' are of Type I and B and B' are of Type I or Type II, and more preferably B and B' are Type II. n represents and integer from 0 to 2000, preferably from 0 to 1000, and more preferably 0 to 200.

L is independently an unconjugated linking group chosen such that the colorants with formula A-N=N—B-L-B—N=N-A, B—N=N-A-L-A-N=N—B or A-N=N—B-L-A-N=N—B cannot form an intramolecular complex with the metal ion M. Preferred examples of L are alkylene groups which may or may not contain one or more heteroatoms in the chain, —O-L'-O—, —NH-L'-NH—, —CONH-L'-NHCO—, —COO-L'-OCO—, —OCO-L'-COO—, —SO₂NH-L'-NHSO₂—, NHCO-L'-CONH—, —NHSO₂-L'-SO₂NH—, —S-L'-S—, —SO₂-L'-SO₂—, where L' is substituted or unsubstituted alkylene, arylene or heteroarylene linking group. Particularly suitable L groups may include —CH₂—NH-L'-NH—CH₂—, —CONH-L'-NHCO—, —NH-L'-NH—, and, —O-L'-O— groups (wherein L' is substituted orunsubstituted alkylene, arylene or heteroarylene linking group.).

M is a polyvalent transition metal ion. Preferred examples of M are Cr, Ni, Co or Cu, more preferably M is Ni or Cr. and most preferably M is Ni.

Below are examples of colorants used in inks of the invention. The colorants in the present invention include but are not limited to these examples. The colorants are shown in the azo tautomeric form, but any example may exist as either the hydrazone tautomeric form or a mixture of hydrazone and azo forms. The colorants are shown with acidic groups in protonated form but any ionized form associated with a positive counterion of any type may be included:

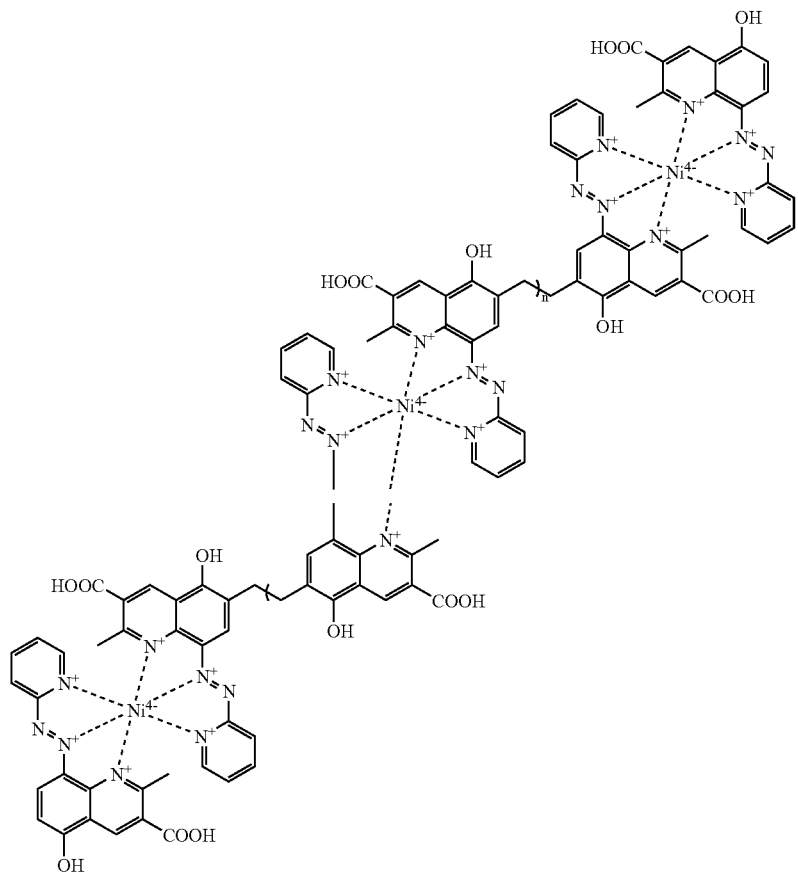
4
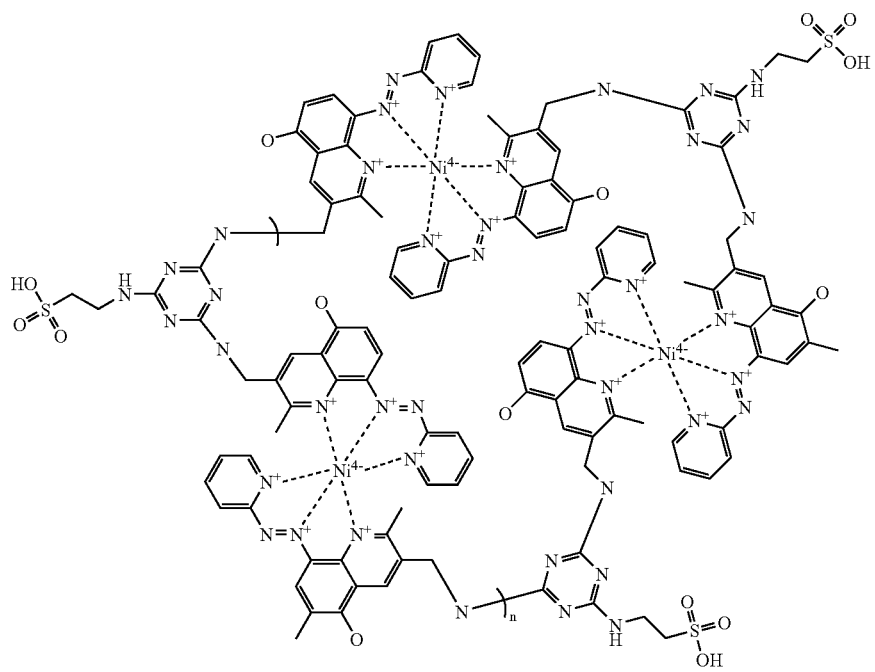
5

-continued
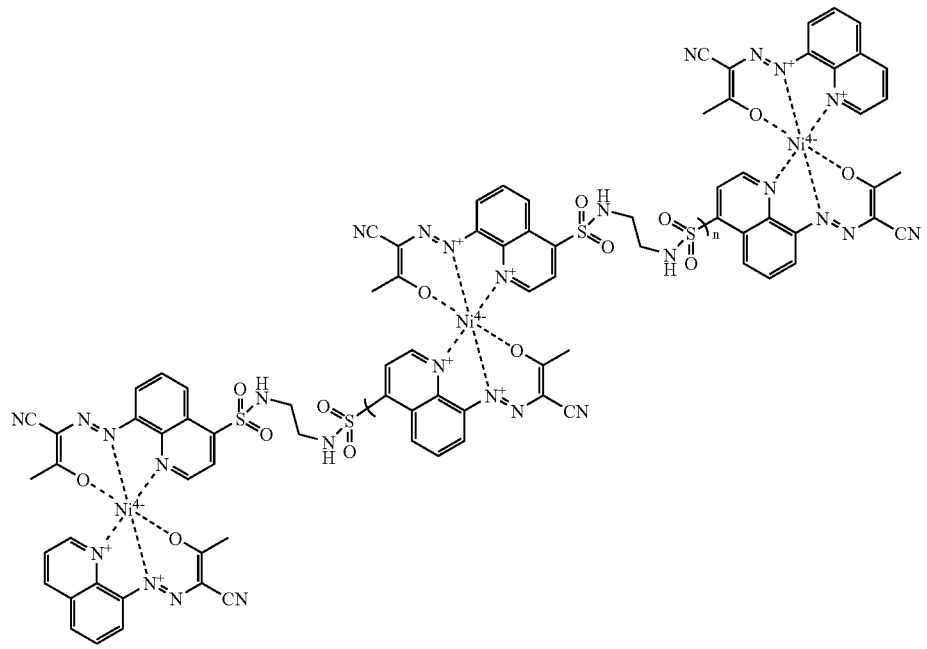
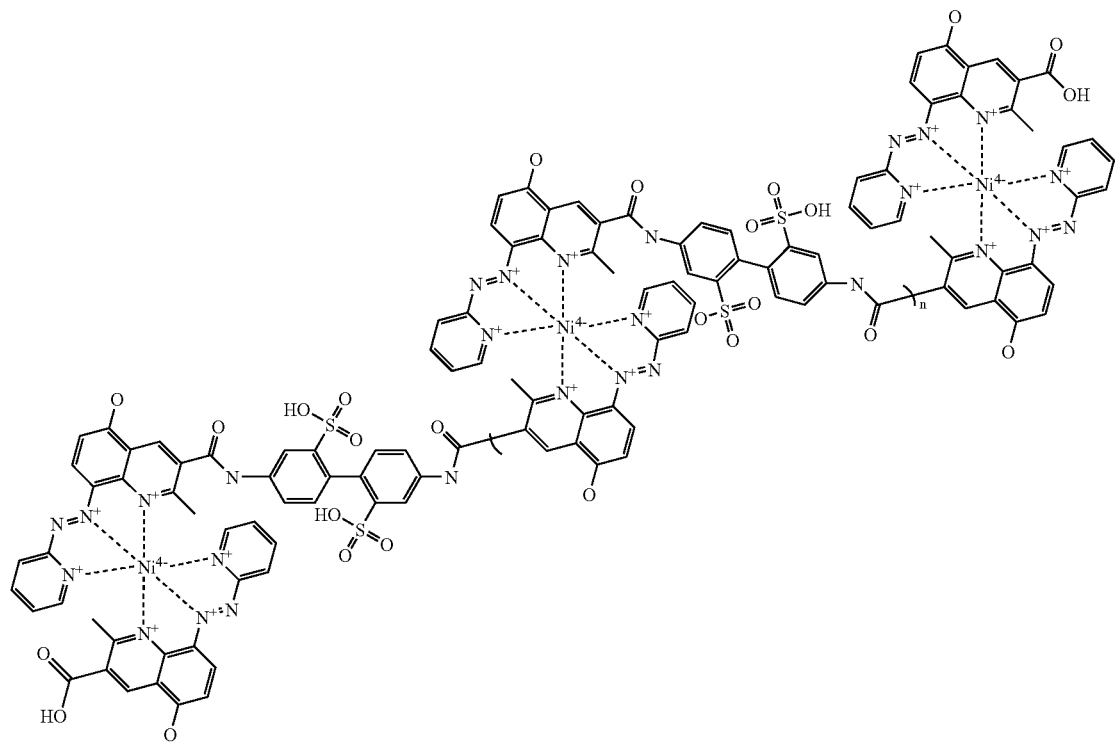

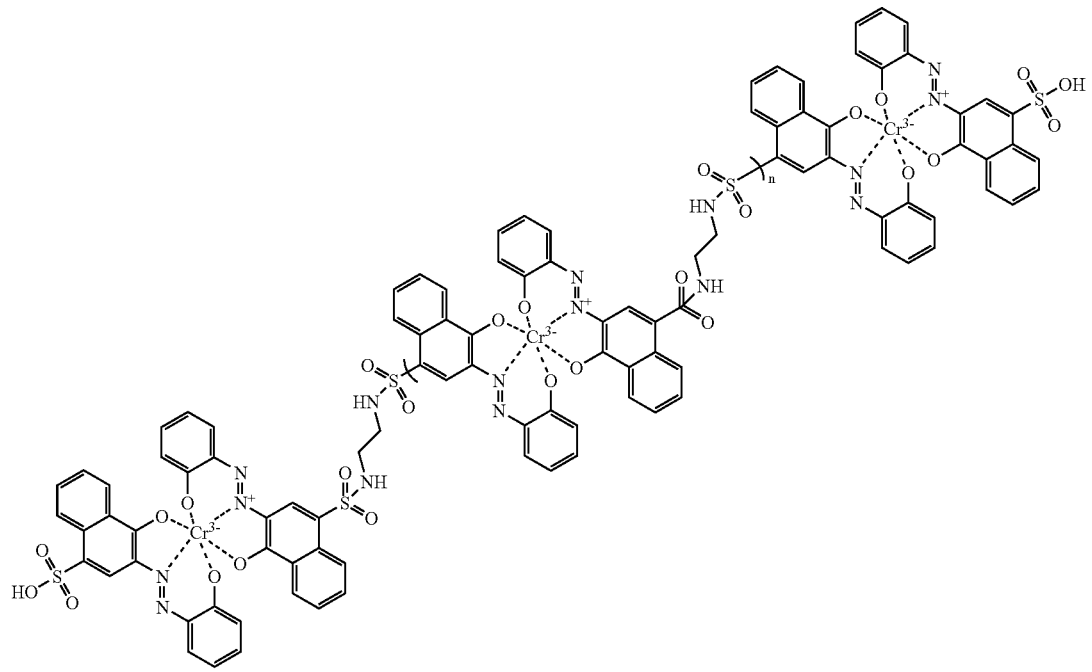
8
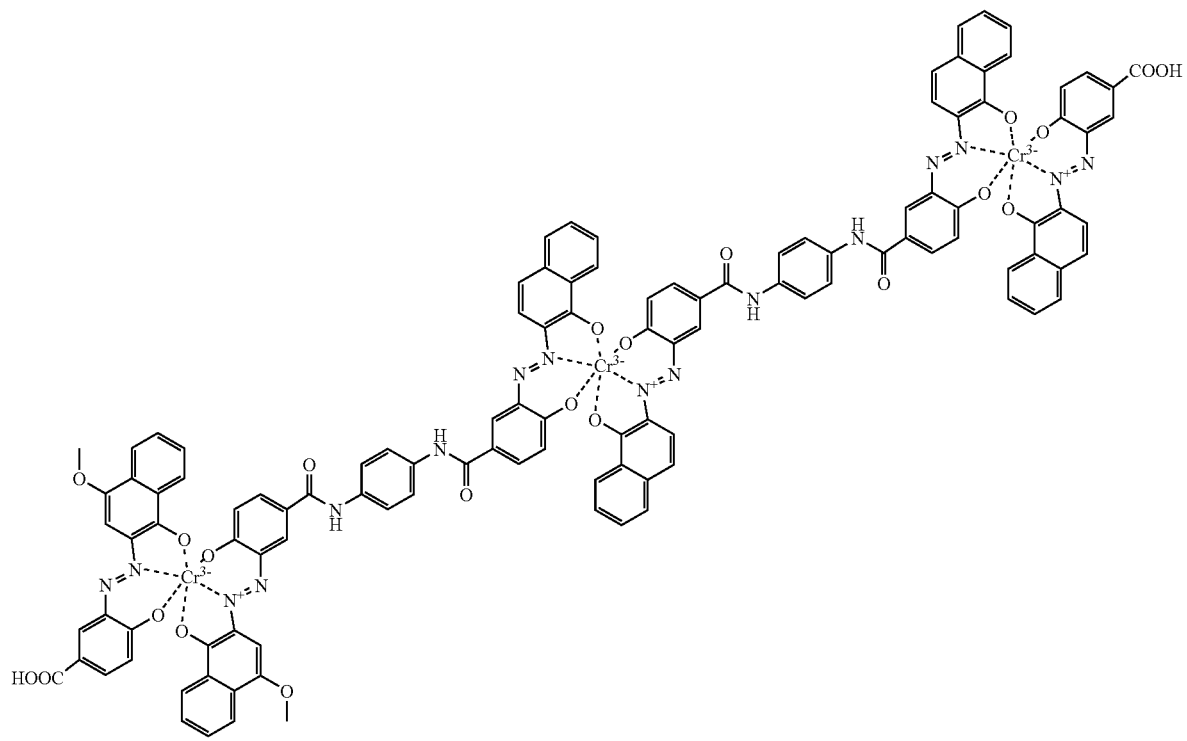
9

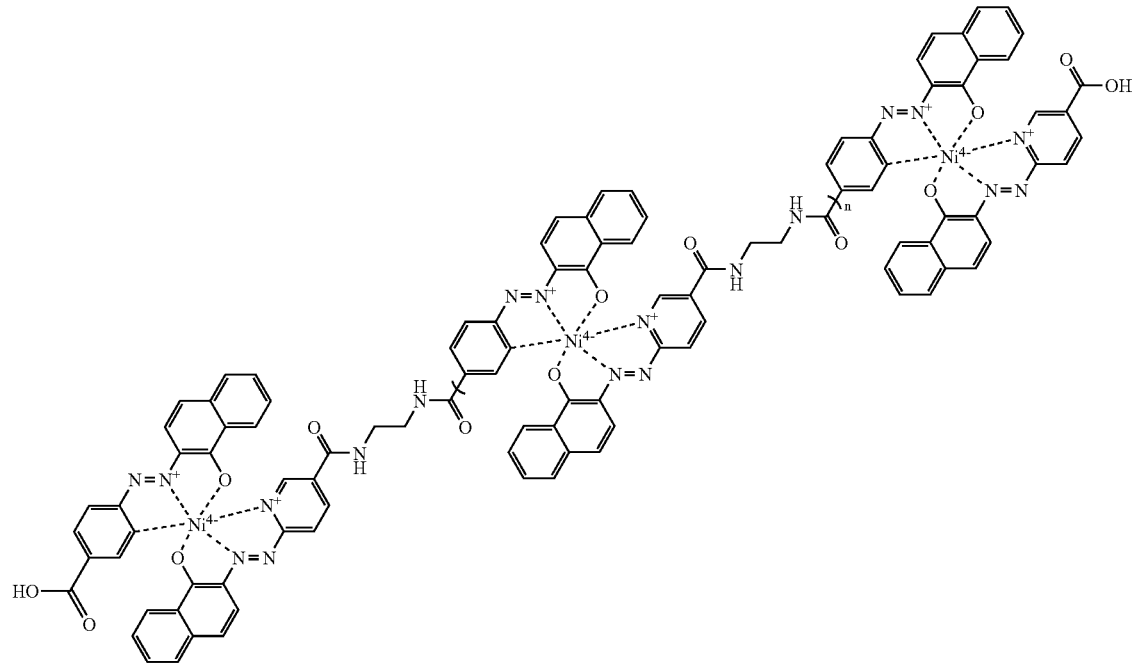
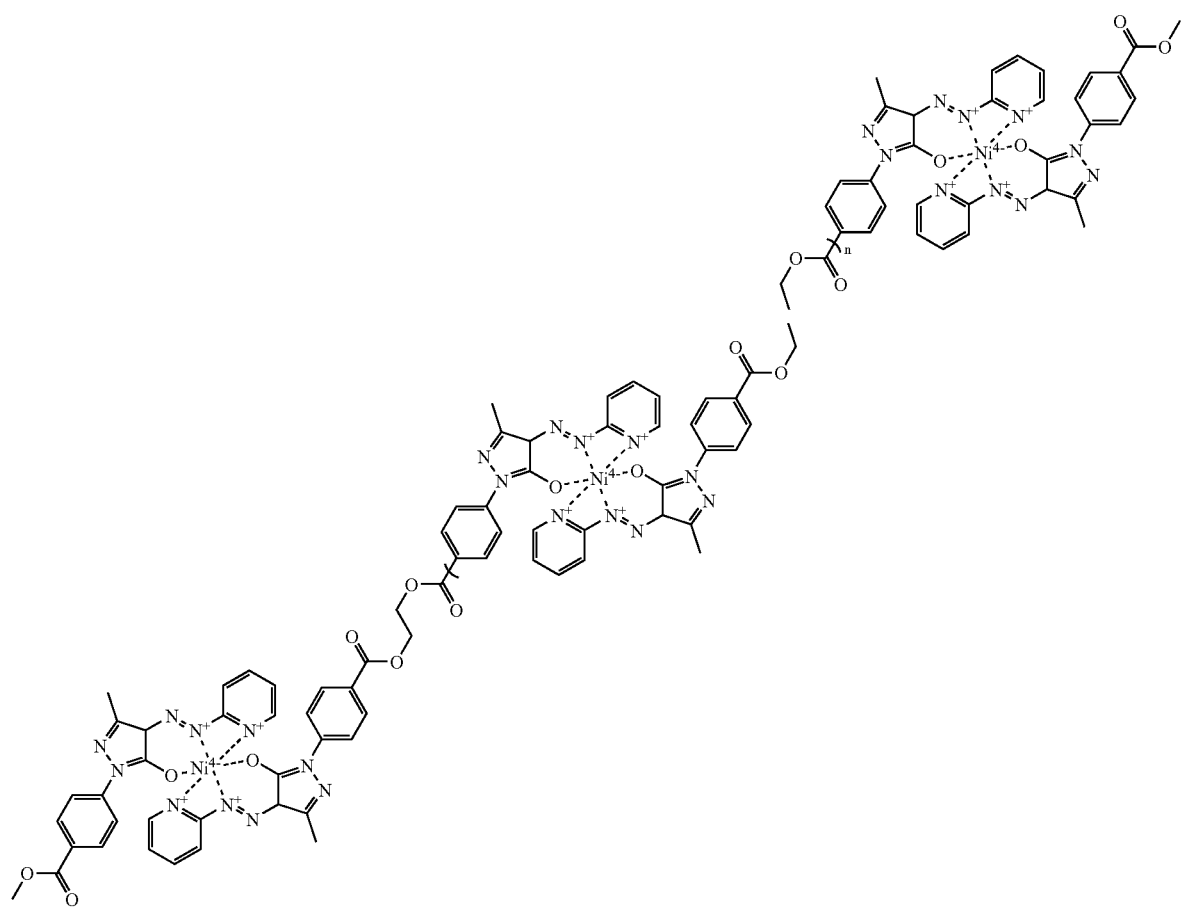

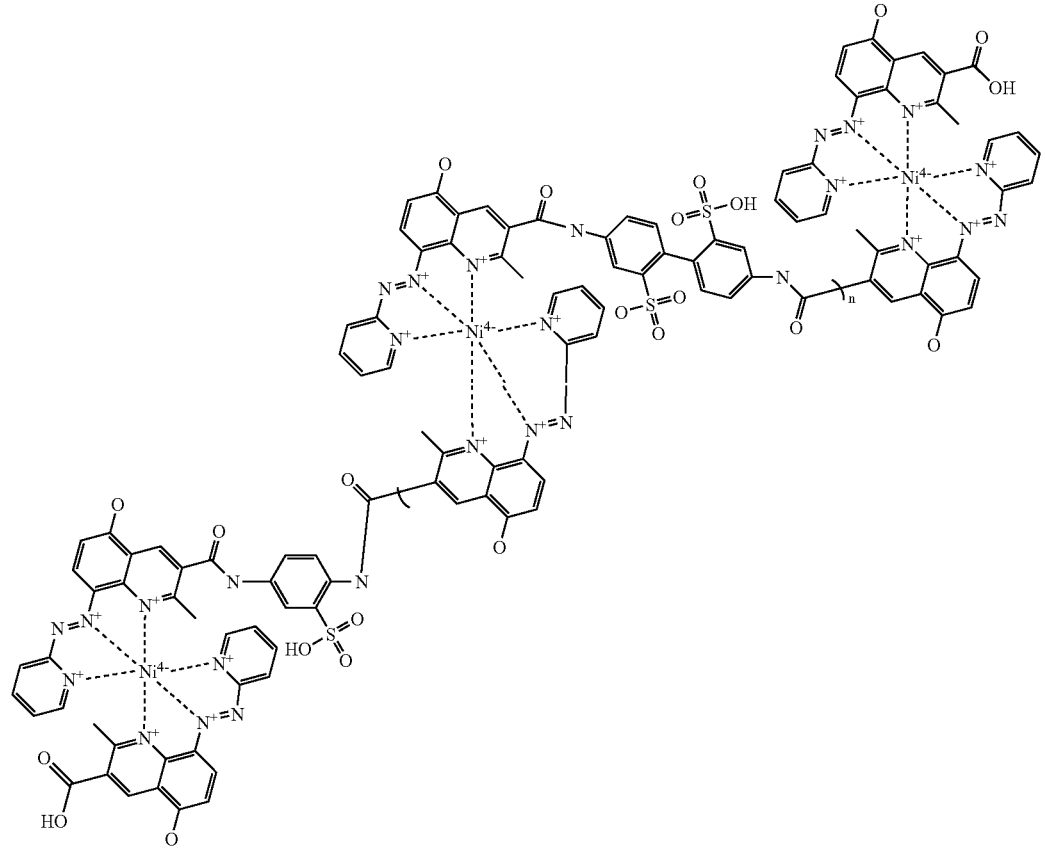

12 wherein n=0-200

Unless otherwise specifically stated, substituent groups, rings or radicals which may be substituted on molecules herein include any groups, whether substituted or unsubstituted, which do not destroy the colorant properties necessary for the chosen utility. When the term "group", "ring" or "radical" is applied to the identification of a substituent containing a substitutable hydrogen, it is intended to encompass not only the substituents unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired colorant properties for a specific application and can include, for example, hydrophobic groups, solubilizing groups, blocking groups, releasing or releasable groups, etc.

In the above dye descriptions, examples of an alkyl group include methyl, ethyl, isopropyl, hydroxyethyl, 3-sulfopropyl and m-carboxybenzyl. Examples of an aryl group include phenyl, naphthyl, 3,5-biscarboxyphenyl and 4-sulfophenyl. Examples of a heteroaryl group include pyridyl, imidazolyl and quinolyl. Examples of halogen include chloro, fluoro, bromo and iodo. Examples of an acyl group include acetyl and 4-sulfobenzoyl. Examples of an alkoxy group include methoxy, 3-carboxypropoxy and 2-hydroxyethoxy. Examples of an aryloxy group include phenoxy, 3-carboxyphenoxy and 4-sulfophenoxy. Examples of an alkoxy- or aryloxy-carbonyl group of 1-10 carbon atoms include methoxycarbonyl, ethoxycarbonyl, 2-methoxyethoxycarbonyl and 3-sulfophenoxycarbonyl. Examples of an alkyl- aralkyl-, aryl-, diaryl-or dialkyl carbamoyl group include N-methylcarbamoyl, N-methyl-N-4-sulfophenyl-carbamoyl, N,N-bis (4-carboxyphenyl)carbamoyl. Examples of an alkyl-aralkyl-, aryl-, diaryl-or dialkyl sulfamoyl group include N-methylsulfamoyl, N-methyl-N-phenyl-sulfamoyl, N-(p-sulfophenyl)sulfamoyl and N,N-bis (4-carboxyphenyl)sulfamoyl. Examples of an acylamino group include acetamido, methoxyethylacetamido and 3-carboxybenzamido. Examples of a ureido group include N-methylureido, ureido and N,N'-dimethylureido. Examples of a sulfonylamino group include methanesulfonamido, p-toluenesulfonamido and 2-sulfatoethanesulfonamido. Examples of an alkyl-aralkyl-, aryl- diaryl- or dialkylamino group include methylamino, N,N-dimethylamino, methoxy-ethylamino and 3-sulfoanilino.

The state of the multimetallic polymeric azo colorants used in the ink composition is not particularly limited. For example, the colorants can be in a fully solvated state similar to that of a monomer dye which is fully dissolved in the ink composition. The colorants can also be in a particulate state similar to that of pigments used in pigment-based ink jet ink compositions. Such pigments are either self-dispersing or are typically dispersed with surfactants or polymers, and they have average particle sizes of less than about 200 nm. Preferably, such pigment-like multimetallic polymeric azo colorants have an average particle size of less than about 40 nm. The colorants can also exist in a state somewhere in between that of a fully solvated dye and a pigment. In such a state, the colorants would be in nanoparticulate form having an average particle size of less than 10 nm. In addition, the colorants could exist in more than one of the aforementioned states in a given ink composition.

The multimetallic polymeric azo colorants may be used in the ink composition in combination with other types of colorants that are well known in the art of ink jet printing; including pigments, dyes, other polymeric dyes, loaded-dye/latex particles, or combinations thereof. Any effective amount of colorant(s) may be used in the ink composition, generally from 0.1 to 10% by weight, and preferably from 0.5 to 6% by weight. The ink composition may be yellow, magenta, cyan, black, gray, red, violet, blue, green, orange, brown, etc. The exact choice and amount of colorants present in the ink composition will depend upon the specific application and particular performance requirements such as color reproduction and image stability.

The multimetallic polymeric azo colorants may be used in any type of ink jet ink composition including those that are aqueous- or solvent-based, and in a liquid, solid or gel state at room temperature and pressure. The type of ink jet ink composition will depend on the type of ink jet printer that the ink composition will be printed with. It is well known in the art that drop-on-demand printheads and continuous printheads each require ink compositions with a different set of physical properties in order to achieve reliable and accurate jetting of the ink composition.

In one embodiment of the invention, the ink composition of the invention is aqueous-based and contains water and water-miscible organic compounds referred to in the art as humectants, co-solvents, penetrating agents, etc. Such compounds are used to prevent the ink composition from drying out or crusting in the nozzles of an ink jet printhead, aid solubility of the components in the ink composition, or facilitate penetration of the ink composition into a recording element after printing. Representative examples of such organic compounds used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, glycerol, 2-methyl-2,4-pentanediol, 1,2,6-hexanetriol, 2-ethyl-2-hydroxymethyl-1,3-propanediol, 1,5-pentanediol, 1,2-hexanediol, and thioglycol; (3) lower mono- and di-alkyl ethers derived from the polyhydric alcohols; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol. For example, typical aqueous-based ink compositions useful in the invention may contain, relative to the total weight of the ink, water at 20-95 weight % and one or more water-miscible organic compounds at 5-40 weight %.

Other components present in aqueous-based ink compositions include surfactants, defoamers, biocides, buffering agents, conductivity enhancing agents, anti-kogation agents, drying agents, waterfast agents, chelating agents, water soluble polymers, water dispersible polymers, inorganic or organic particles, light stabilizers, or ozone stabilizers, all of which are well known in the art of ink jet printing.

The exact choice and amount of ink components will depend upon the printing system (printer, printhead, etc.) that the ink composition will be printed with. Important physical properties are viscosity and surface tension. For aqueous-based inks, acceptable viscosities are no greater than 20 cP, and preferably in the range of about 1.0 to 6.0 cP; and acceptable surface tensions are no greater than 60 dynes/cm, and preferably in the range of 28 dynes/cm to 45 dynes/cm.

The invention can be used in conjunction with any type of image-recording element, including but not limited to plain paper, vinyl, canvas, and specialty paper designed specifically for use with ink jet printing.

The following examples are provided to illustrate, but not to limit, the invention.

EXAMPLES

Example 1

Preparation of Colorant 12 Derivatives 12-1 Through 12-5. These are Polymeric Materials with the Same General Formula (12) but with Different Molecular Weight Distribution.

Inventive Colorant 12-1

Dimeric ligand 13 (76 mg, 0.1 mmoles) was dissolved in 5 mL dimethylformamide (DMF) together with the monomeric ligand 14 (62 mg, 0.2 mmoles). To this solution was added a solution of Ni(OAc)$_2$.4H$_2$O (50 mg, 0.2 mmoles) in 10 mL of water and the resulting mixture was heated at 75° C. for 2 hours. After the mixture cooled down, it was diluted with 50 mL water and the precipitate was filtered on a fritted funnel. Inventive Colorant 12-1 was dried and printed using the Microjet method (see below).

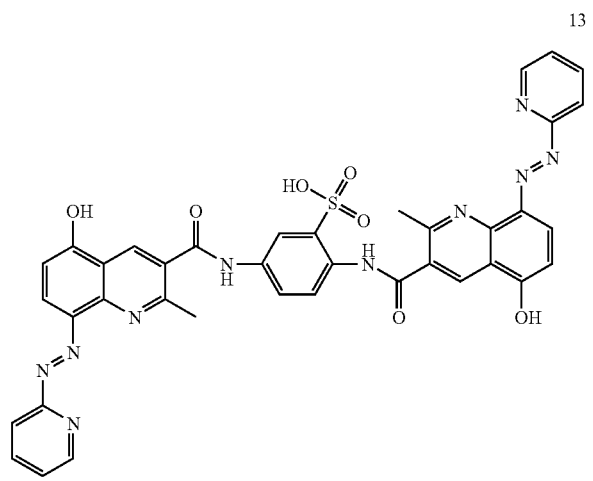

13

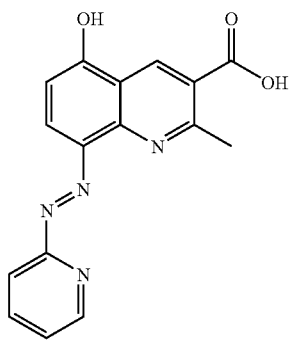

14

Inventive Colorant 12-2

The filtrate from the procedure above (preparation of Inventive Colorant 12-1) was acidified with glacial acetic acid to pH 5 and a second precipitate formed that was filtered and dried. Inventive Colorant 12-2 obtained this way was printed using the Microjet method (see below).

Inventive Colorant 12-3

Dimeric ligand 13 (154 mg, 0.2 mmoles) was dissolved in 5 mL dimethylformamide (DMF) together with the monomeric ligand 14 (62 mg, 0.2 mmoles). To this solution was added a solution of Ni(OAc)$_2$.4H$_2$O (50 mg, 0.2 mmoles) in 10 mL of water and the resulting mixture was heated at 90° C. for 48 hours. After the mixture was cooled down, it was acidified with 3 drops of glacial acetic acid and the precipitate was filtered in a fritted funnel. The solid Inventive Colorant 12-3 was dried and printed using the Microjet method (see below).

Inventive Colorant 12-4

This colorant was prepared in an array of 3 microwave vials and heated in a microwave reactor at different temperature/ratios of dimer:monomer with the intent of obtaining a wide range of polymeric molecular weights.

Vial 1. 7:3 ratio of dimer 13:monomer 14

54 mg dimer (0.07 mmoles)+10 mg monomer (0.03 mmoles)+21 mg Ni(OAc)$_2$.4H$_2$O in 1 ml DMF The sample was heated in a Personal Chemistry microwave reactor for 5 min at 200° C.

Vial 2. 6:4 ratio of dimer 13:monomer 14

46 mg dimer (0.06 mmoles)+12 mg monomer (0.04 mmoles)+20 mg Ni(OAc)$_2$.4H$_2$O in 1 ml DMF The sample was heated in a Personal Chemistry microwave reactor for 90 min at 100° C.

Vial 3. 5:5 ratio of dimer 13:monomer 14

38 mg dimer (0.05 mmoles)+15 mg monomer (0.05 mmoles)+19 mg Ni(OAc)$_2$.4H$_2$O in 1 ml DMF The sample was heated in a Personal Chemistry microwave reactor for 90 min at 100° C.

The contents of the vials 1 through 3 were combined and the resulting mixture was fractionated using reverse-phase preparative HPLC. The instrument employed for purification was a Gilson 215 with automated injector/fraction collector.

The column was a YMC ODS AQ 4.0×20 cm, 15 um, radial compression cartridge held in a Waters RCM module. Separation was achieved by using a gradient method with water, ammonium acetate 0.1M ammonium acetate pH 4.65 buffer, isopropyl alcohol (IPA) and acetonitrile (MeCN). The method employed was: 10% IPA, 10% MeCN, 10% buffer, 70% water to 20% IPA, 20% MeCN, 10% buffer, 50% water in 30 minutes, 5 minutes wash with 90% MeCN and 5 minutes equilibration at initial conditions (10% IPA, 10% MeCN, 10% buffer, 70% water). The material was fractionated into 3 fractions based on the times of elution from the column: Inventive Colorant 12-4 fraction 1 eluted between 25-27 minutes, Inventive Colorant 12-4 fraction 2 eluted between 27-29 min, Inventive Colorant 12-4 fraction 3 eluted between 29-31 minutes.

Inventive Colorant 12-5

0.84 g dimer 13 and 67 mg monomer 14 were suspended/dissolved in 50 ml DMF. Molecular ratio of dimer/monomer is 5:1. To this mixture were added 297 mg Ni(OAc)$_2$.4H$_2$O. The mixture was heated at 85° C. for 4 hours. An HPLC chromatogram showed multiple polymeric peaks. The DMF was evaporated o dryness in a Genevac centrifugal evaporator, 100 ml water were added and the precipitate that formed was filtered.

Comparative Colorant C-1

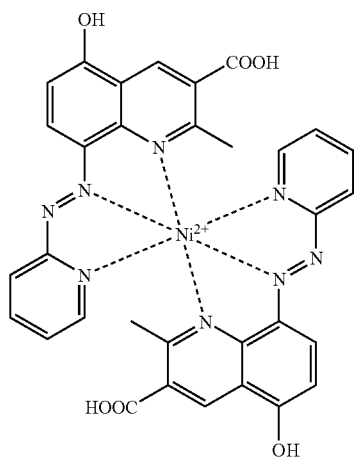

C-1

The synthesis of this dye is described in U.S. Pat. No. 6,001,161.

Preparation of Ink Compositions

Inventive Inks I-1, I-2 and I-3

Inventive Inks I-1, I-2 and I-3 were prepared by dissolving the appropriate amount of dye into an aqueous formulation containing 1.0 wt. % triethanolamine (TEA-OH) and 0.5% wt. surfactant Surfynol® 465 (Air Products Co.). For example, Inventive Ink I-1 was prepared by dissolving 9.2 mg of Inventive Colorant 12-1 into an aqueous formulation containing 1.0 g of 3% wt. triethanolamine solution, 1.5 g of 1% wt. Surfynol® 465, and 0.49 g water. The triethanolamine component was added in order to completely solubilize the dye. Inventive Ink I-2 contained Inventive Colorant 12-2, and Inventive Ink 1-3 contained Inventive Colorant 12-3.

Inventive Inks I-4, I-5 and I-6

Inventive Inks I-4, I-5 and I-6 were prepared as described above, except that no TEA-OH was used. For example, Inventive Ink I-4 was prepared by mixing 0.6 mL aliquot from a concentrate of Inventive Colorant 12-4 fraction 1 with 1.0 g 1% wt. Surfynol® 465 and 0.4 g distilled water. Inventive Ink I-5 contained Inventive Colorant 12-4 fraction 2, and Inventive Ink 1-6 contained Inventive Colorant 12-4 fraction 3.

Comparative Ink CI-1

Comparative Ink CI-1 was prepared by adding 0.062 g of a 5% wt. aqueous solution of Comparative Dye C-1 to 4.938 g of another aqueous solution containing diethyleneglycol (DEG), glycerol and Surfynol® 465 such that the final concentrations were 0.6% wt. DEG, 0.6% wt. glycerol and 0.5% wt. Surfynol® 465, respectively. The ink was filtered through 0.45-μm glass microfiber filter (Whatman, cat. no. AV125UGMF).

Microjet Printing using the Cartesian Technologies™ Microdispenser.

For convenience and ease of handling purposes, many of the colorants described above were formulated as ink compositions with a final weight of 2 or 3 g. However, the printing process using the microdispenser does not require more than 0.5 g of ink. From the examples described above, one can see that this amount can be easily achieved with less than 10 mg of colorant sample. Results of stability testing using Microjet printed patches mirrored that of samples printed with standard ink jet heads as shown by extensive crossover testing with both commercial and novel colorants.

The filtered ink compositions were placed inside the wells of a standard microtiterplate used as a source plate. The instrument uses an aspiration/dispense routine to print the test image using drop-on-demand ink-jet technology. The test images are printed on various paper recording elements mounted in special in-house machined holders ("fade plates"). This holder is a clamshell style frame designed to have the same dimensions as a standard microtiterplate. Different ink jet recording elements can be easily installed in these frames to obtain the destination plates.

The ink compositions described above were printed on two different microporous recording elements:
Media A: Konica QP™ Photo Inkjet Paper
Media B: Kodak Instant-Dry Photographic Glossy Paper The test images were allowed to dry for 24 hours at ambient temperature and humidity before evaluation.

Evaluation of Test Images

The test images generated above were subjected to ozone fade testing under two separate sets of conditions:
1) HI Ozone: 24 hr exposure at 5 parts per million ozone concentration in the dark at 50% relative humidity
2) LI Ozone: 2 weeks exposure at 60 parts per billion ozone concentration under typical office fluorescent lighting and humidity conditions Status A reflection densities were measured before and after testing using an X-Rite® 820 Transmission/Reflection densitometer. Percent density retained was then calculated and results are reported in Table 1.

TABLE 1

| Ink Composition | Colorant | Test | % Density Retained Media A | % Density Retained Media B |
|---|---|---|---|---|
| Inventive Ink I-1 | Inventive Colorant 12-1 | HI Ozone | 43 | 54 |
| | | LI Ozone | 58 | 81 |
| Inventive Ink I-2 | Inventive Colorant 12-2 | HI Ozone | 18 | 29 |
| | | LI Ozone | 36 | 75 |
| Inventive Ink I-3 | Inventive Colorant 12-3 | HI Ozone | 32 | 41 |
| | | LI Ozone | 39 | 59 |
| Inventive Ink I-4 | Inventive Colorant 12-4 fraction 1 | HI Ozone | 67 | 77 |
| | | LI Ozone | not tested | not tested |
| Inventive Ink I-5 | Inventive Colorant 12-4 fraction 2 | HI Ozone | 92 | 91 |
| | | LI Ozone | not tested | not tested |
| Inventive Ink I-6 | Inventive Colorant 12-4 fraction 3 | HI Ozone | 88 | 81 |
| | | LI Ozone | not tested | not tested |
| Comparative Ink CI-1 | Comparative Dye C-1 | HI Ozone | 9* | 17* |
| | | LI Ozone | 23 | 58 |

*Average values are given for inks printed and evaluated more than once.

The above results show that the Inventive Inks exhibit better overall ozonefastness under both sets of conditions as compared to Comparative Ink CI-1.

Example 2

Preparation of Ink Composition

Inventive Ink I-7

Inventive Ink I-7 was prepared using an amount of the Inventive Colorant 12-5 to give 4.5% of colorant relative to the total weight of the ink. Other additives included DEG at 12 wt. %, Rhodocal® DS4 (Rhodia) at 5.1 wt. %, Strodex™ PK90 (Dexter Co.) at 0.38 wt. %, and the balance deionized water to 100 wt. %. The ink was filtered through a membrane having a pore size of 0.45 μm.

Ink Jet Printing

Inventive Ink I-7 and Comparative Ink CI-1 were tested on a Canon s520 printer with a thermal printhead (catalogue number QY6-0034-000). This drop-on-demand type multi-head performs the ink jet recording by imparting heat energy to the ink in the printhead to produce ink droplets (ejection orifice diameter: 17 micron; drive voltage: 19 V; 0.2 mJ/pL droplet). The printhead accommodates four colors: cyan, magenta, yellow and black. The color ink channels have 270 nozzles/color with 600 dpi resolution. The black has 160 nozzles with 300 dpi resolution.

Test images consisting of a series of density patches were printed on two different microporous recording elements:

Media A: Kodak Rapid-Dry Photographic Glossy Paper
Media B: Konica QP™ Photo Inkjet Paper The test images were allowed to dry for 24 hours at ambient temperature and humidity before evaluation.

Evaluation of Test Images

Patches having densities of about 1.0 were subjected to ozone fade testing by placing the test images in a chamber having a 5 parts per million (ppm) ozone concentration in the dark at 50% relative humidity (HI Ozone). Status A reflection densities were measured before testing using an X-Rite® 820 Transmission/Reflection densitometer. Densities were measured after 24 hours and after 7 days. Percent density retained was then calculated and results are reported in Table 2.

TABLE 2

| Ink Composition | Colorant | Test HI Ozone | % Density Retained Media A | % Density Retained Media B |
|---|---|---|---|---|
| Inventive Ink I-7 | Inventive Colorant 12-5 | HI-1 day | 81 | 57 |
| | | HI-7 days | 68 | 40 |
| Comparative Ink CI-1 | Comparative Colorant CI-1 | HI-1 day | 20 | 9 |
| | | HI-7 days | 11 | 7 |

The above results show that Inventive Ink I-7 exhibits far better ozonefastness as compared to Comparative Ink CI-1.

The invention has been described in detail with particular reference to certain preferred embodiments thereof, but it will be understood that variations and modifications can be effected within the spirit and scope of the invention.

The invention claimed is:

1. An ink composition comprising a multimetallic oligomeric or polymeric azo colorant wherein said colorant is derived from the polymerization reaction of a polyvalent metal cation with a dimeric tridentate ligand containing a coordinating azo group.

2. The ink composition of claim 1 wherein the colorant is represented by formulae 1a, 2a, 3a, 1b, 2b, or 3b:

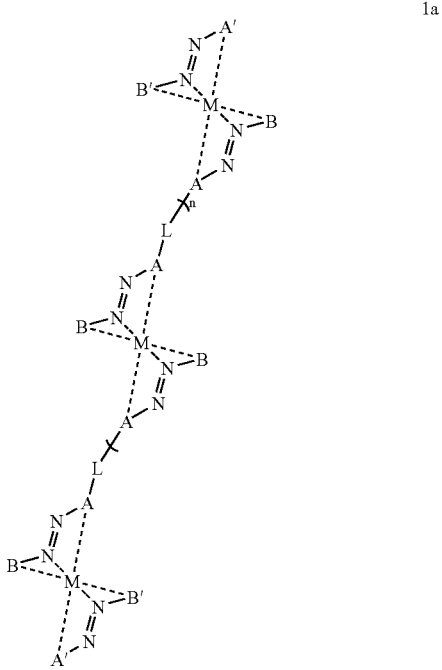

-continued

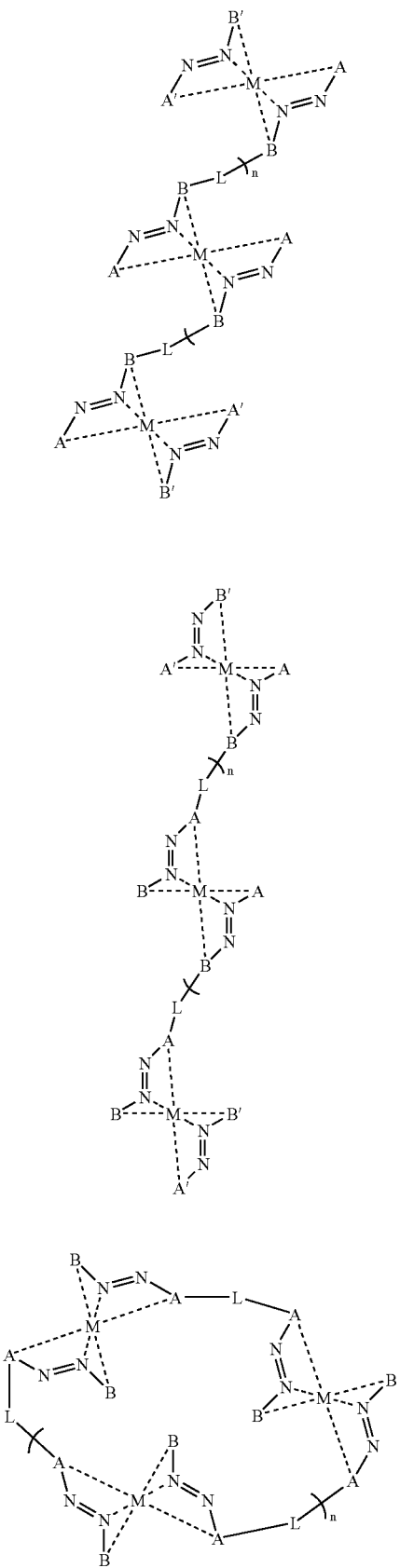

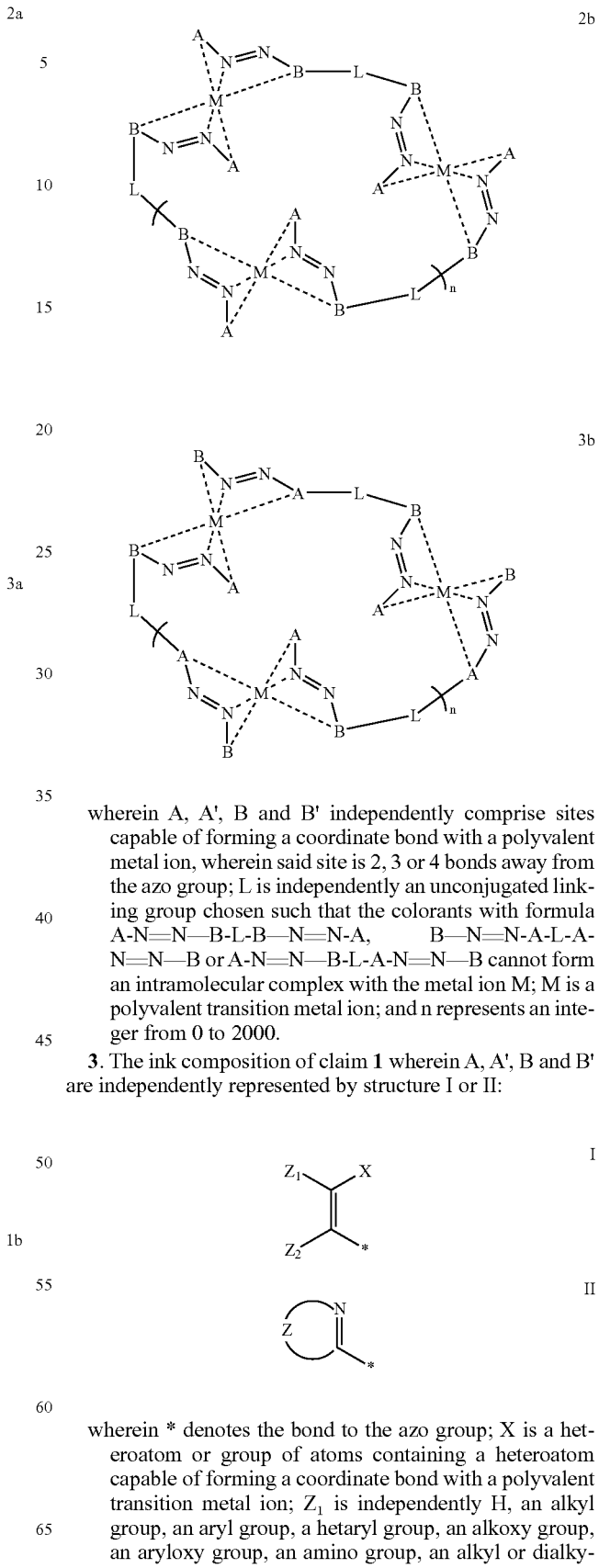

wherein A, A', B and B' independently comprise sites capable of forming a coordinate bond with a polyvalent metal ion, wherein said site is 2, 3 or 4 bonds away from the azo group; L is independently an unconjugated linking group chosen such that the colorants with formula A-N=N—B-L-B—N=N-A, B—N=N-A-L-A-N=N—B or A-N=N—B-L-A-N=N—B cannot form an intramolecular complex with the metal ion M; M is a polyvalent transition metal ion; and n represents an integer from 0 to 2000.

3. The ink composition of claim 1 wherein A, A', B and B' are independently represented by structure I or II:

wherein * denotes the bond to the azo group; X is a heteroatom or group of atoms containing a heteroatom capable of forming a coordinate bond with a polyvalent transition metal ion; $Z_1$ is independently H, an alkyl group, an aryl group, a hetaryl group, an alkoxy group, an aryloxy group, an amino group, an alkyl or dialkylamino group or an aryl or diarylamino group;

$Z_2$ is independently the same as $Z_1$, a cyano or a nitro group, an alkyl or arylsulfonyll group, an alkoxy or aryloxycarbonyl group, an alkyl, dialkyl, aryl, diaryl or aralkylcarbamoyl group, an alkyl, dialkyl, aryl, diaryl or aralkylsulfamoyl group, an alkanoyl or aroyl group; wherein $Z_1$ and $Z_2$ together may represent the atoms necessary to form a 5- to 7-membered alicyclic, aromatic or heteroaromatic ring and/or $Z_1$ and X may be combined together to form a 5- to 7-membered alicyclic or heteroaromatic ring; and Z contains the atoms necessary to form a fused or unfused heterocyclic ring.

4. The ink composition of claim 3 wherein structure I is:

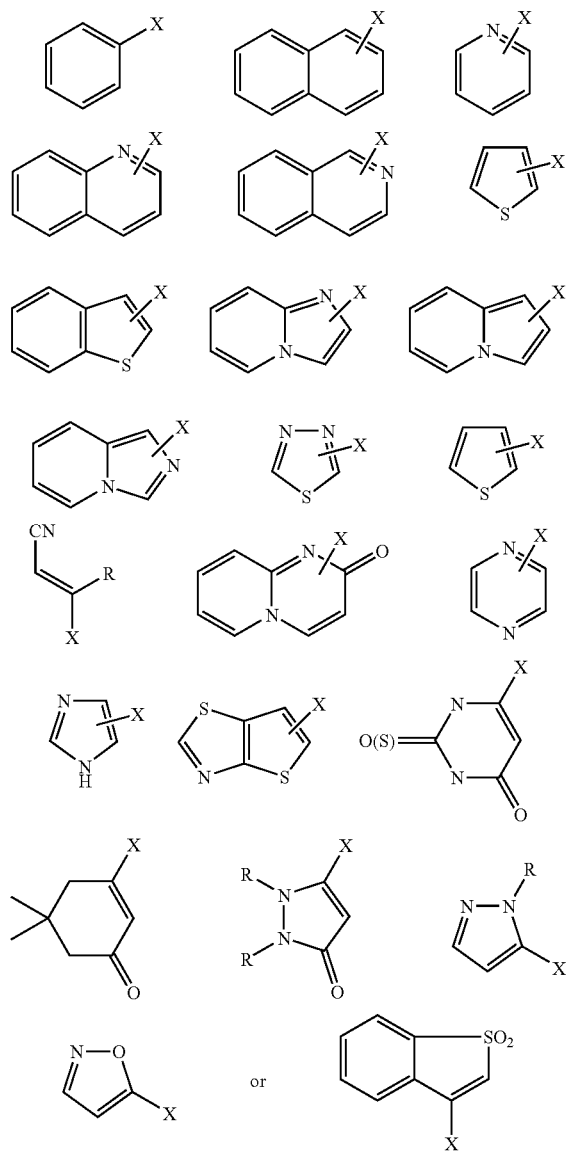

wherein X is a hydroxy, carboxy, amino, or imino group, alkyl- or arylsulfonyl, alkyl- or arylsulfonamido group, a sulfamoyl group, an N-aryl- or N-alkylsulfamoyl group, an alkoxy- or aryloxycarbonyl group, an alkyl- or arylcarbonyl group, a sulfo group, or an aryloxy or alkoxy group; and R is an aryl or alkyl group.

5. The ink composition of claim 3 wherein structure II is:

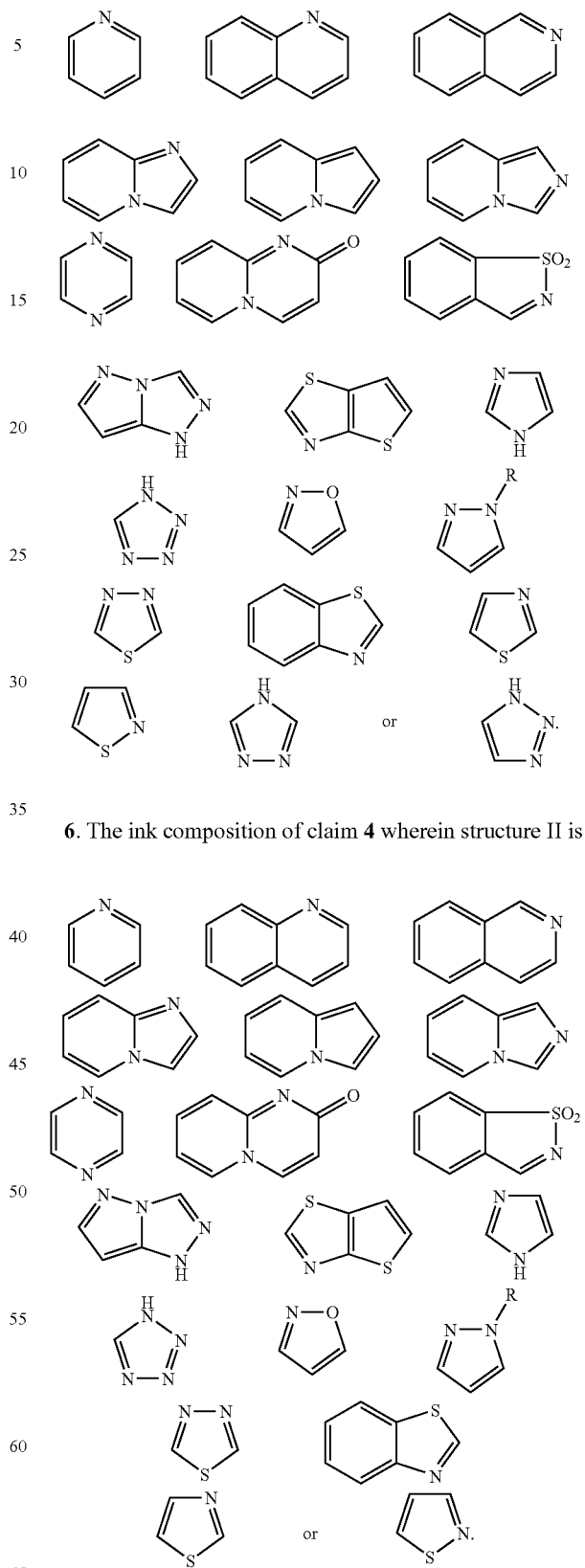

6. The ink composition of claim 4 wherein structure II is:

7. The ink composition of claim 3 wherein structure I is:

wherein * denotes the bond to the azo group; Y is a hydroxy, carboxy, alkyl- or arylsulfonaruide group; and R is an aryl or alkyl group.

8. The ink composition of claim 3 wherein structure II is:

9. The ink composition of claim 7 wherein structure II is:

10. The ink composition of claim 3 wherein A and A' are represented by Structure I and B and B' are represented by Structure I or II.

11. The ink composition of claim 3 wherein A and A' are represented by Structure I and B and B' are represented by Structure II.

12. The ink composition of claim 6 wherein A and A' are represented by Structure I and B and B' are represented by Structure II.

13. The ink composition of claim 2 wherein L is independently an alkylene group which may or may not contain one or more heteroatoms in the chain or a -O-L'-O-, -NH- L'-NH-, -CONH-L'-NHCO-, -COO-L '-OCO-, -OCO-L'-COO-, -SO$_2$NH-L'-NHSO$_2$-, NHCO-L'-CONH-, -NHSO$_2$-L'-SO$_2$NH-, -S-L'-S-, or -SO$_2$-L'-SO$_2$- group wherein L' is an alkylene, arylene or heteroarylene linking group.

14. The ink composition of claim 3 wherein L is independently an alkylene group which may or may not contain one or more heteroatoms in the chain or a -O-L'-O-, -NH-L'-NH-, -CONH-L'-NHCO-, -COO -L'-OCO-, -OCO-L'-COO-, -SO$_2$NH-L'-NHSO$_2$-, NHCO-L'-CONH-, -NHSO$_2$-L'-SO$_2$NH-, -S-L'-S-, or -SO$_2$- L'-SO$_2$- group wherein L' is an alkylene, arylene or heteroarylene linking group.

15. The ink composition of claim 6 wherein L is independently an alkylene group which may or may not contain one or more heteroatoms in the chain or a -O-L'-O-, -NH- L'-NH-, -CONH-L'-NHCO-, -COO -L'-OCO-, -OCO-L'-COO-, -SO$_2$NH-L'-NHSO$_2$-, NHCO-L'-CONH-, -NHSO$_2$, -L'-SO$_2$NH-, -S-L'-S-, or -SO$_2$-L'-SO$_2$- group wherein L' is an alkylene, arylene or heteroarylene linking group.

16. The ink composition of claim 2 wherein L is independently a -CH$_2$-NH-L'-NH-CH$_2$-, -O-L'-O-, -NH-L'-NH-, or -CONH -L'-NHCO- group wherein L' is an alkylene, arylene or heteroarylene linking group.

17. The ink composition of claim 3 wherein L is independently a -CH$_2$-NH-L'-NH-CH$_2$-, -O-L'-O-, -NH-L'-NH-, or -CONH -L'-NHCO- group wherein L' is an alkylene, arylene or heteroarylene linking group.

18. The ink composition of claim 6 wherein L is independently a -CH$_2$-NH-L'-NH-CH$_2$-, -O-L'-O-, -NH-L'-NH-, or -CONH -L'-NHCO- group wherein L' is an alkylene, arylene or heteroarylene linking group.

19. The ink composition of claim 2 wherein M is independently Cr, Ni, Co or Cu.

20. The ink composition of claim 3 wherein M is independently Cr, Ni, Co or Cu.

21. The ink composition of claim 6 wherein M is independently Cr, Ni, Co or Cu.

22. The ink composition of claim 2 wherein n is independently 0-1000.

23. The ink composition of claim 3 wherein n is independently 0-1000.

24. The ink composition of claim 6 wherein n is independently 0-1000.

25. The ink composition of claim 1, wherein said ink composition is aqueous-based.

26. The ink composition of claim 25, wherein said ink composition comprises water and water-miscible organic compounds.

27. The ink composition of claim 1, wherein said ink composition is solvent-based.

28. The ink composition of claim 1, wherein said multimetallic oligomeric or polymeric no colorant is fully soluble in the ink composition.

29. The ink composition of claim 1, wherein said multimetallic oligomeric or polymeric azo colorant is a pigment having an average particle size of less than 200 nm.

30. The ink composition of claim 29, wherein said average particle size is less than 40 nm.

31. The ink composition of claim 1, wherein said multimetallic oligomeric or polymeric no colorant is a nanoparticle having an avenge particle size of less than 10 nm.

32. The ink composition of claim 1, wherein said ink composition is a magenta ink.

33. The ink composition of claim 1, wherein said multimetallic oligomeric or polymeric no colorant is present in an amount of from 0.1 to 10% by weight.

34. The ink composition of claim 1, wherein said ink composition comprises a second colorant.

35. The ink composition of claim 1 wherein the colorant is represented by the following structures:

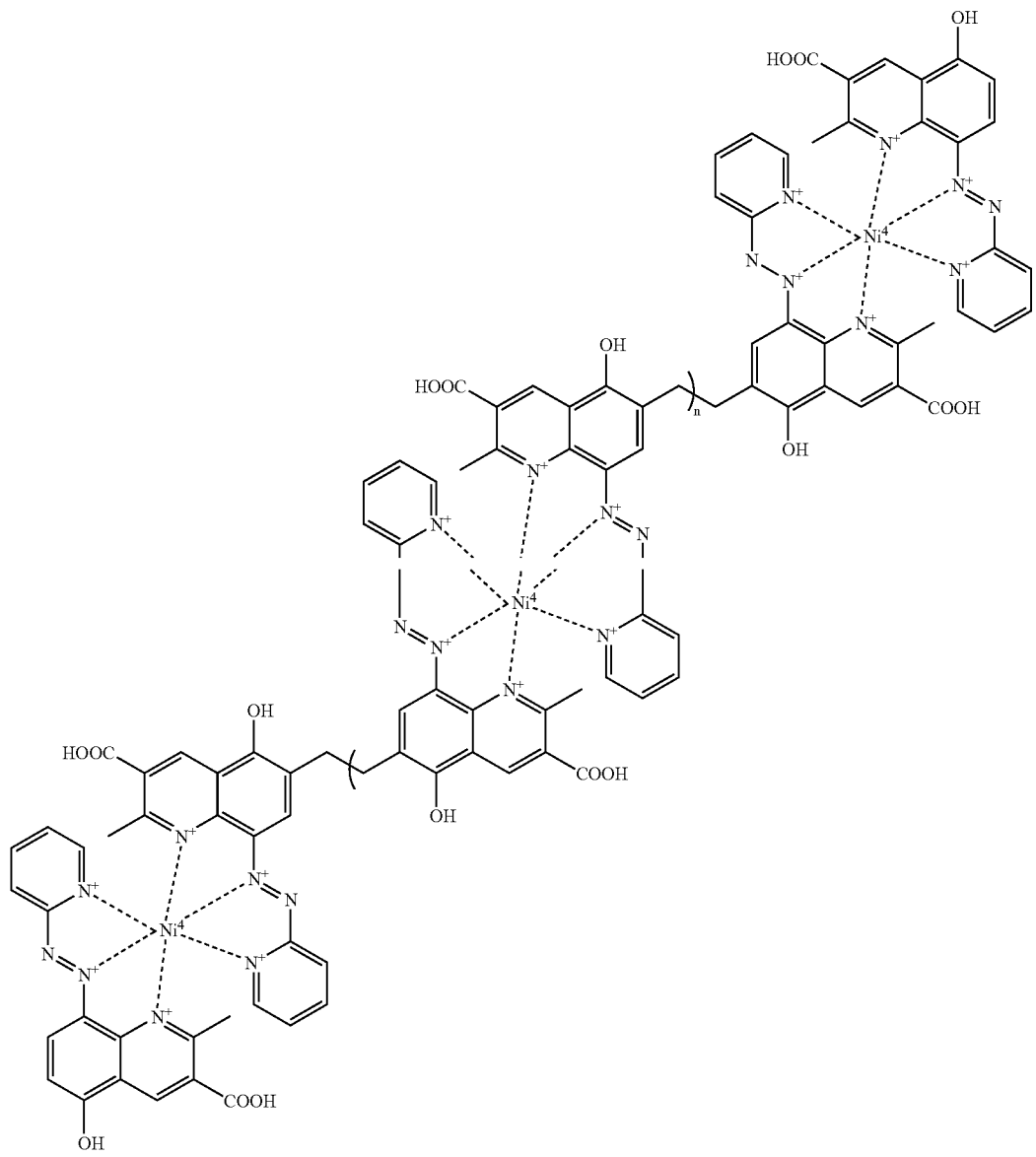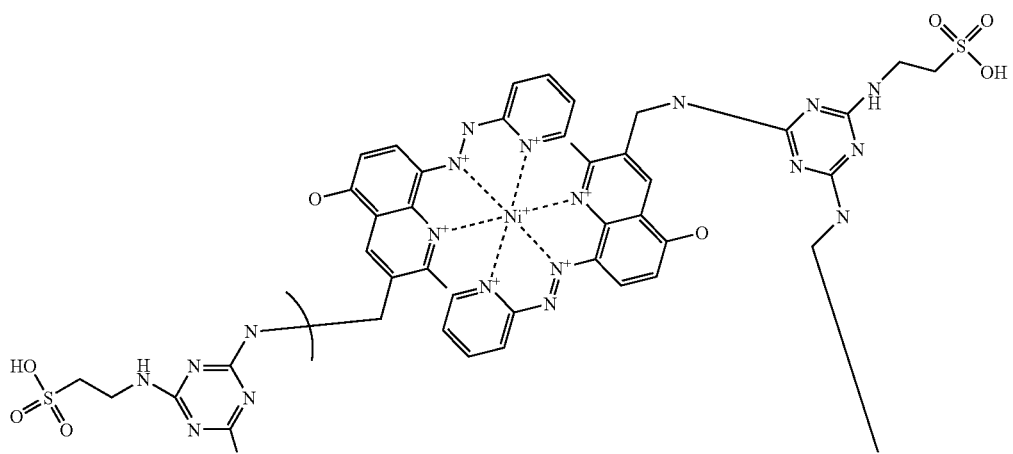

-continued
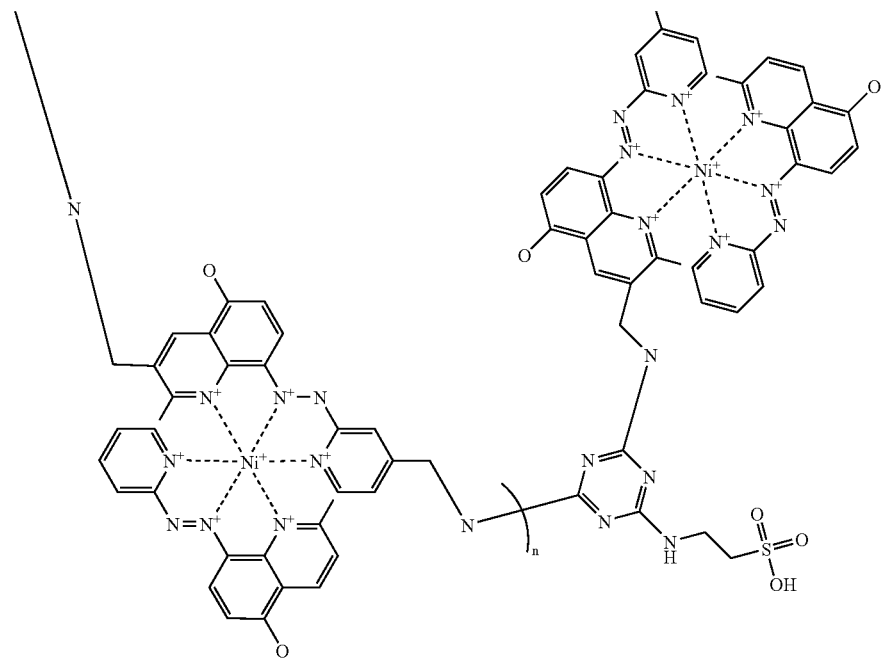
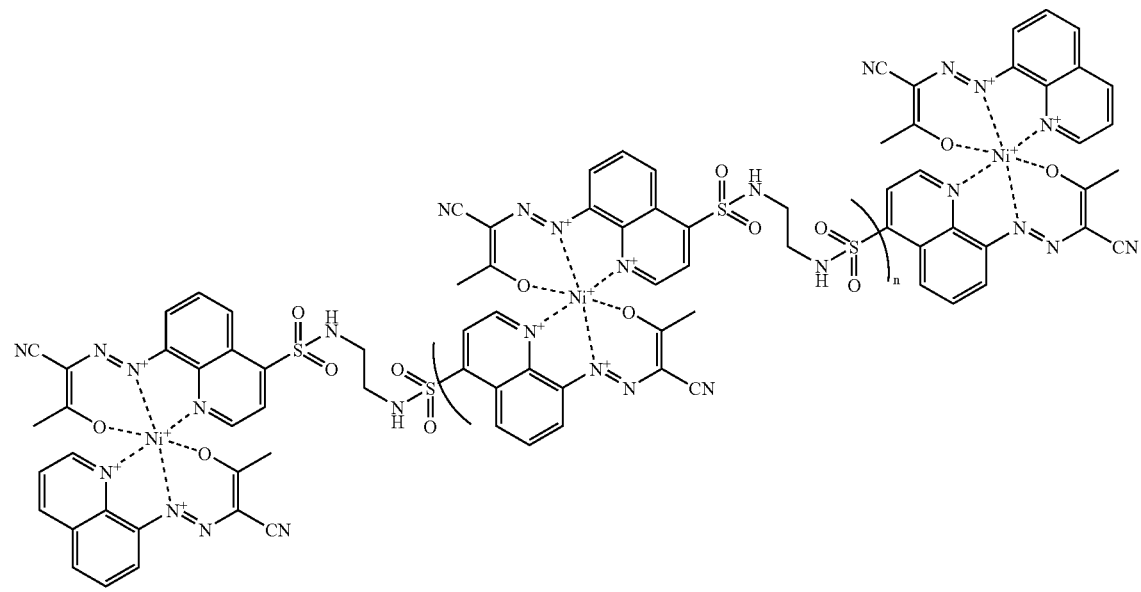

-continued
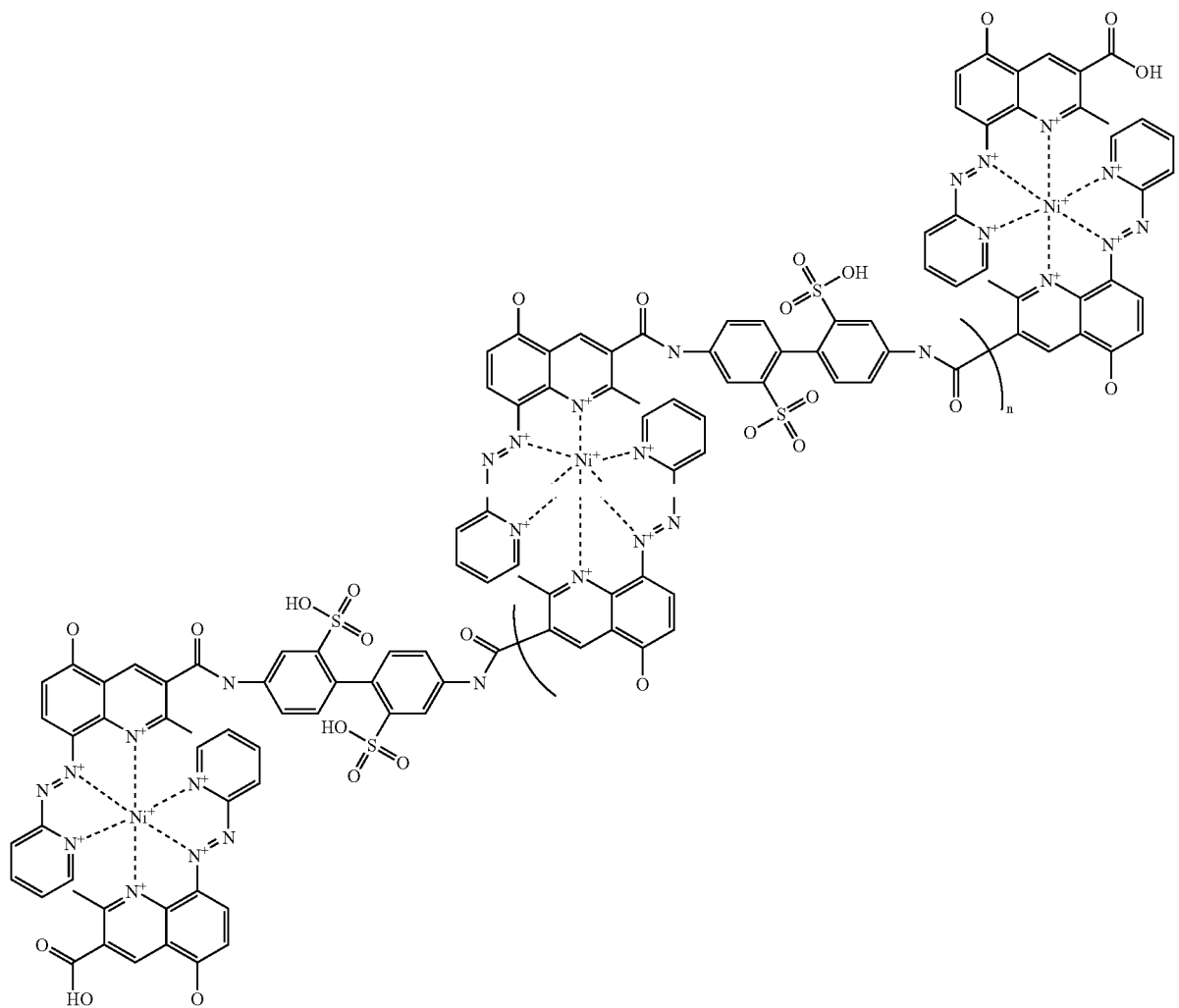
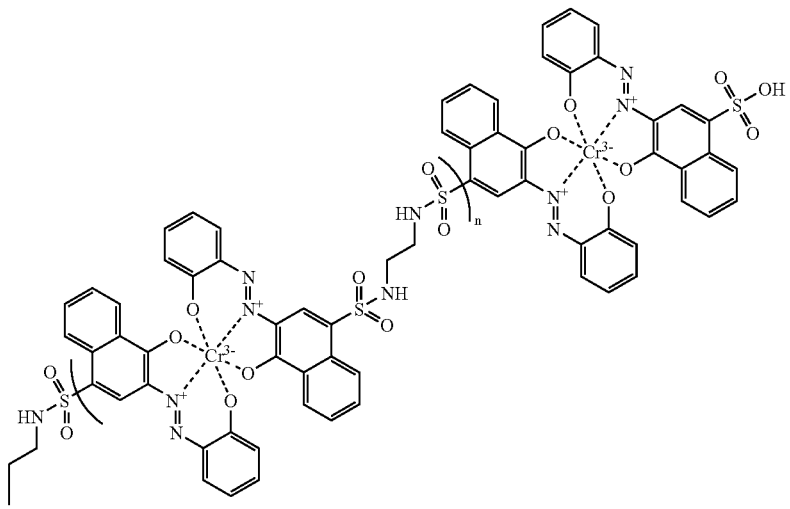

-continued
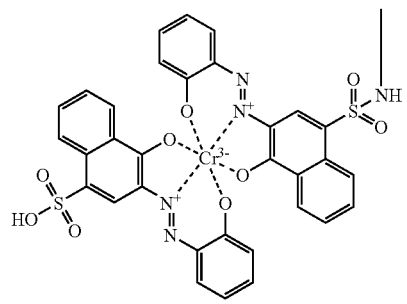
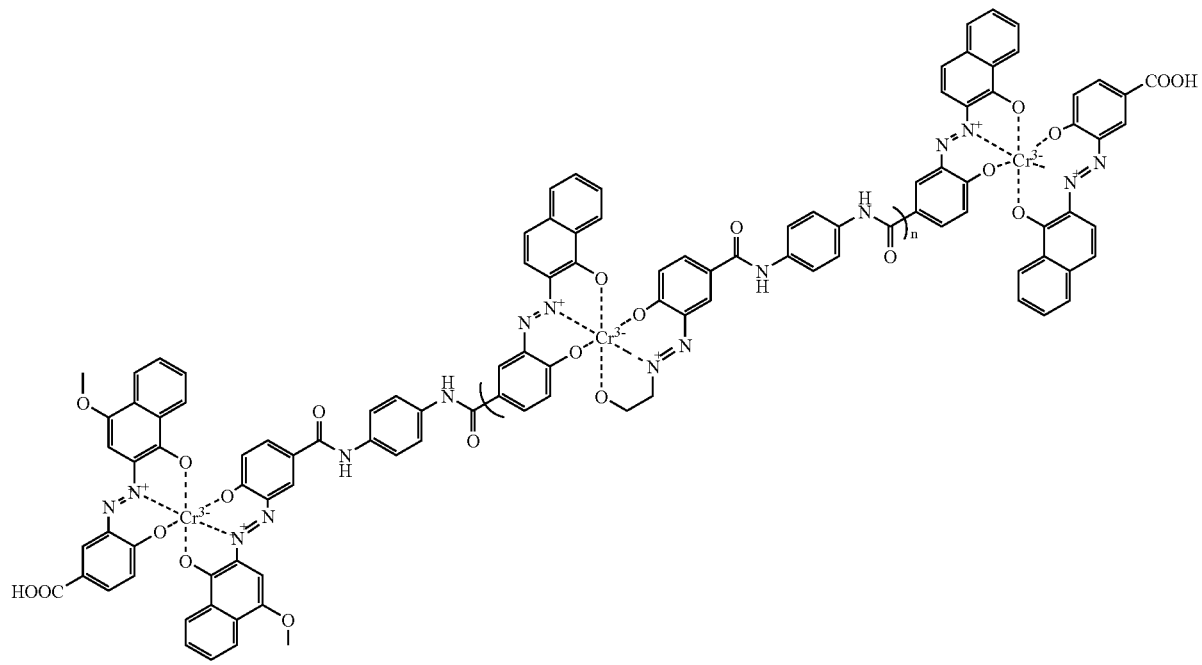
9
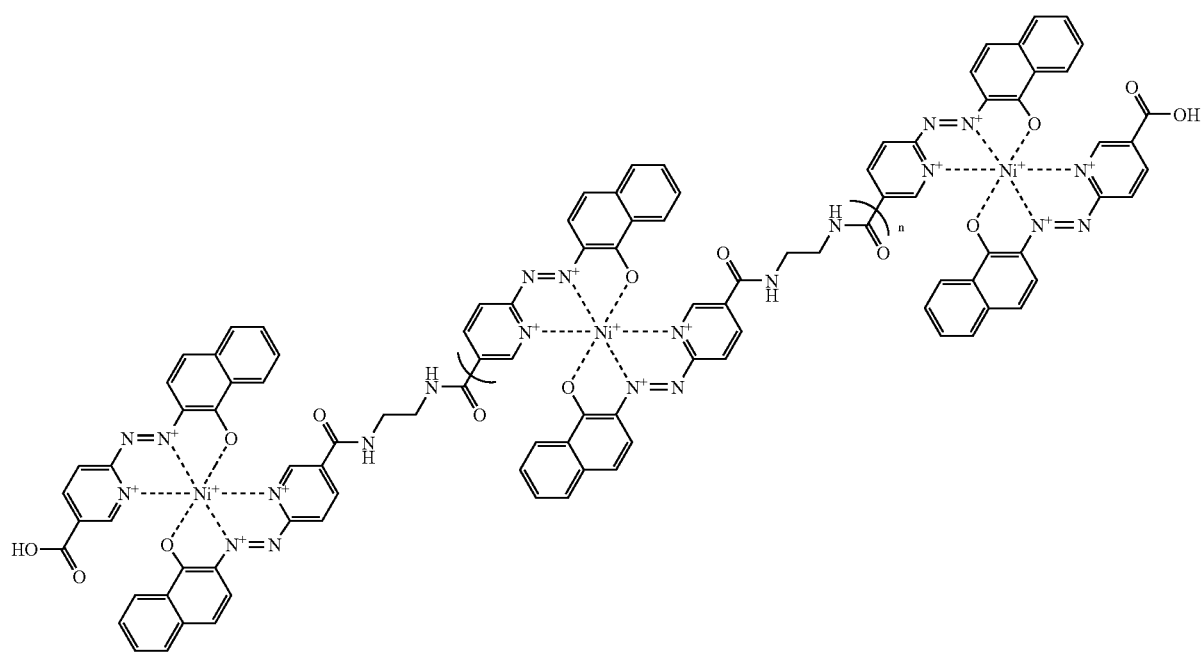
10

-continued
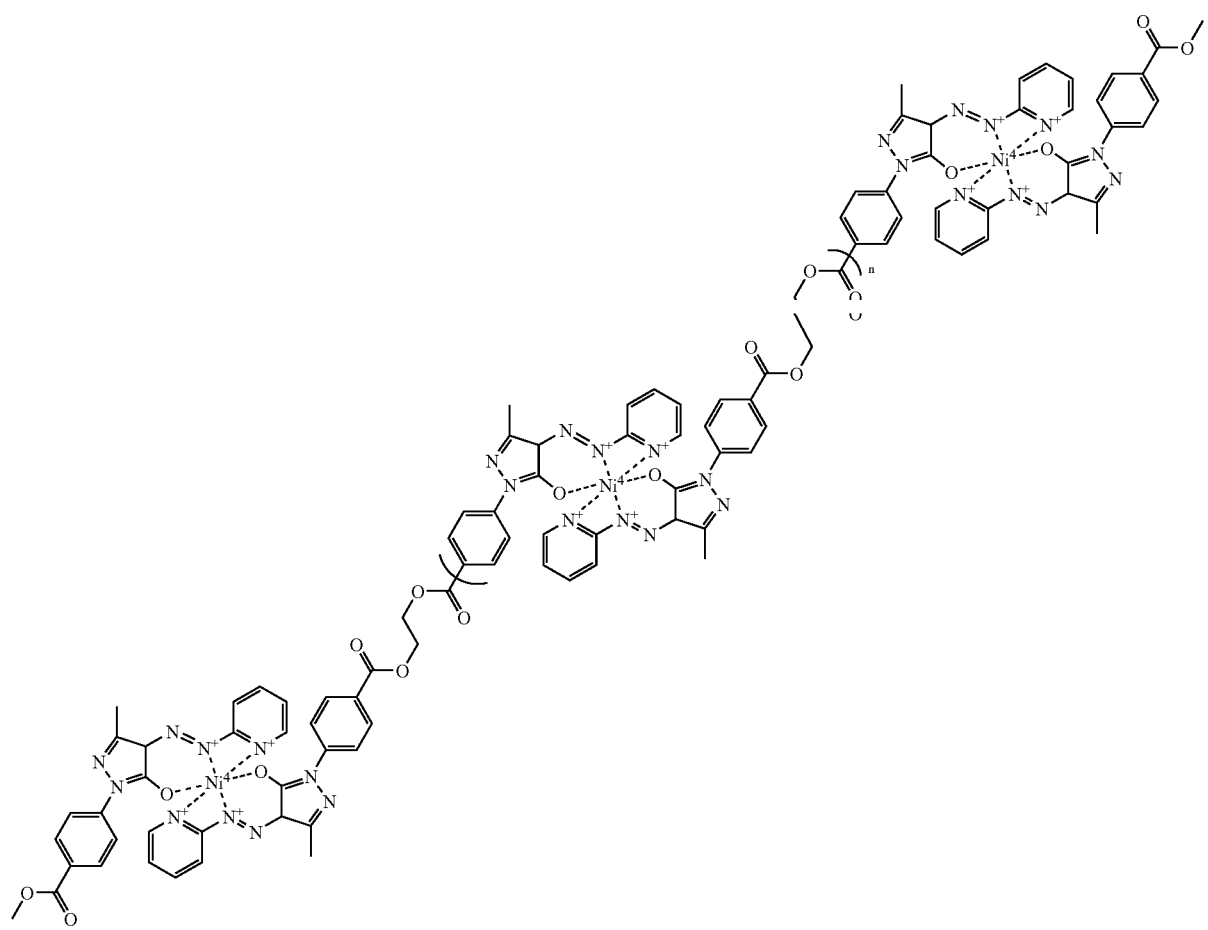
or
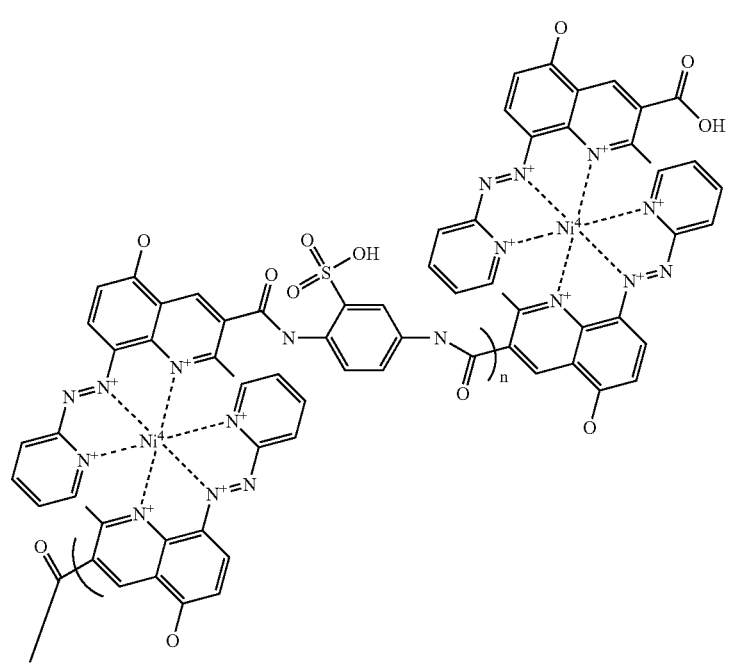

-continued
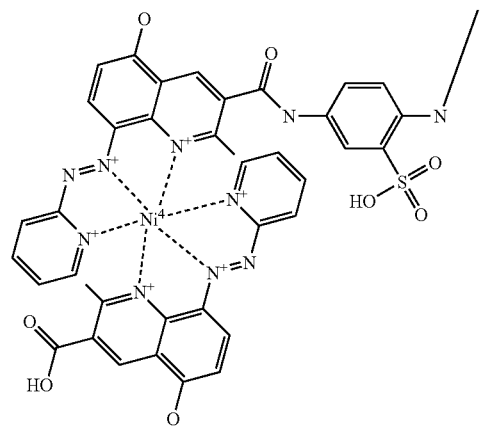
20
\* \* \* \* \*

UNITED STATES PATENT AND TRADEMARK OFFICE
CERTIFICATE OF CORRECTION

PATENT NO.        : 7,449,500 B2
APPLICATION NO.   : 10/865665
DATED             : November 11, 2008
INVENTOR(S)       : Madaras et al.

It is certified that error appears in the above-identified patent and that said Letters Patent is hereby corrected as shown below:

Cover Page, under paragraph heading "OTHER PUBLICATIONS":

- After the first occurrence of "US Serial No." line 6 insert -- 10/865,665 filed June 10, 2004, now issued (US Patent No. 7,449,500) --.

- Beginning with the second occurrence of "US Serial No." delete remainder of text through and including "2004.".

Columns 17 and 18, delete Structure 11, and insert correct Structure 11:

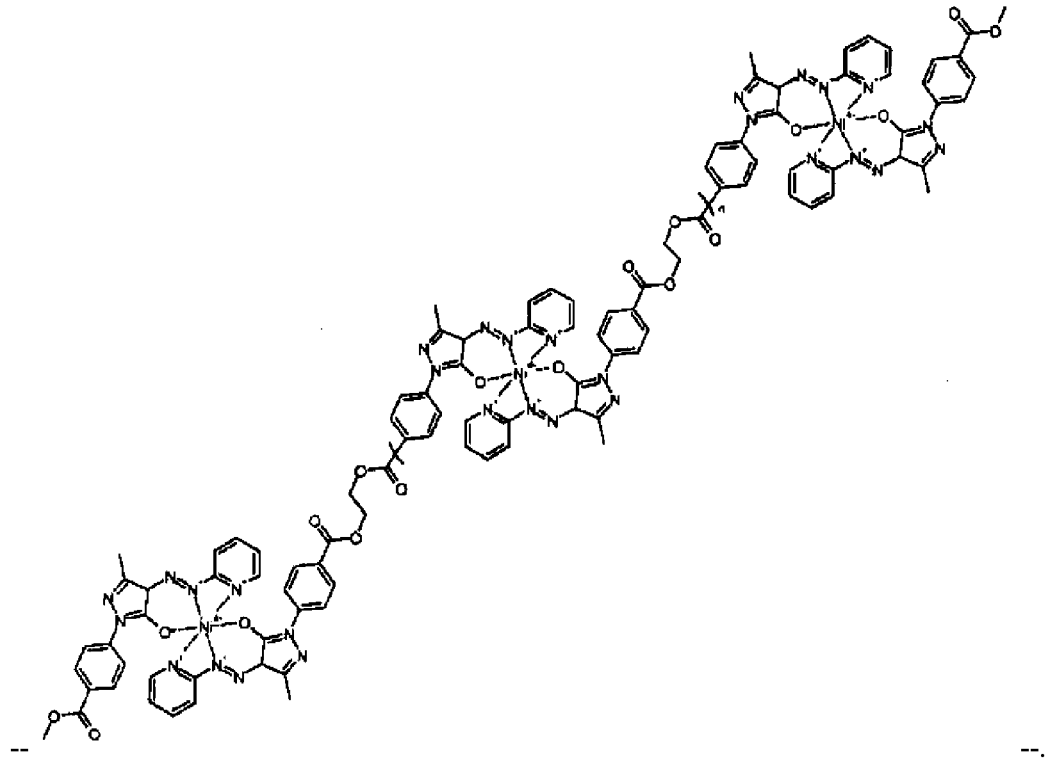

Column 33, claim 7, line 28, delete "arylsulfonaruide" and insert -- arylsulfonamide --.

Column 34, claim 28, line 49, delete "no" and insert -- azo --.

Column 34, claim 31, line 57, delete "no" and insert -- azo --.

UNITED STATES PATENT AND TRADEMARK OFFICE
CERTIFICATE OF CORRECTION

PATENT NO.       : 7,449,500 B2
APPLICATION NO.  : 10/865665
DATED            : November 11, 2008
INVENTOR(S)      : Madaras et al.

It is certified that error appears in the above-identified patent and that said Letters Patent is hereby corrected as shown below:

Column 34, claim 31, line 58, delete "avenge" and insert -- average --.

Column 34, claim 33, line 62, delete "no" and insert -- azo --.

Columns 35 and 36, delete Structure 4, and insert correct Structure 4:

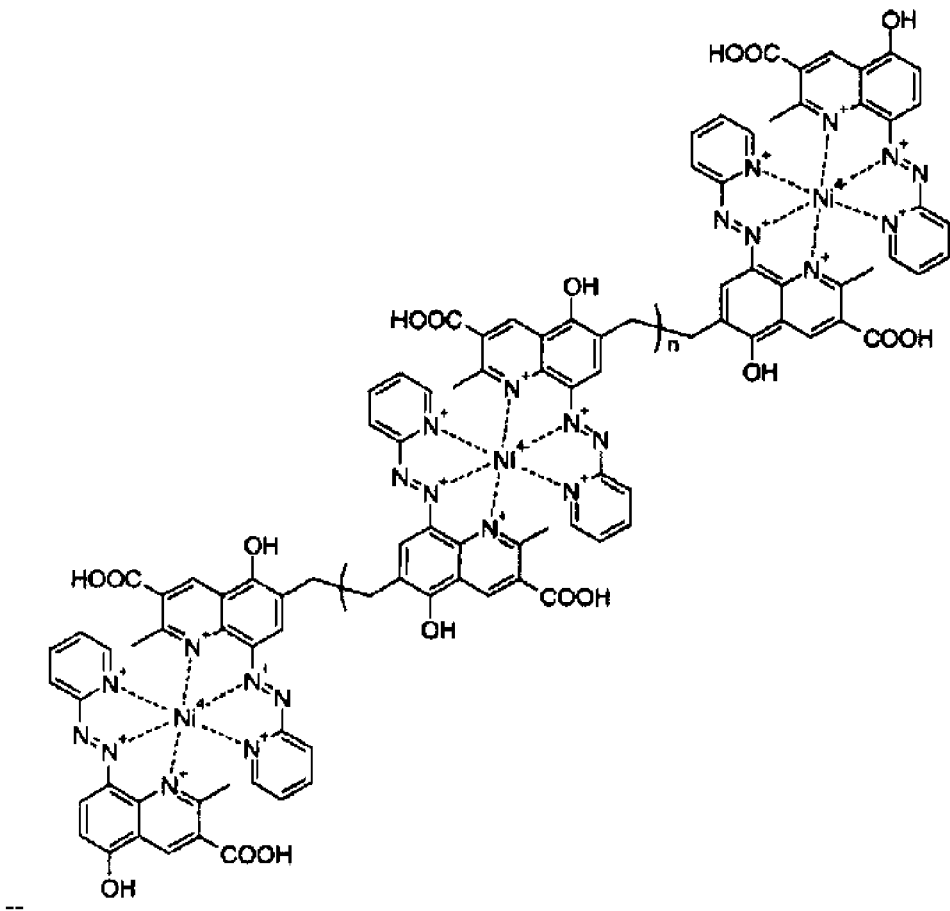

--                                                                                      --.

UNITED STATES PATENT AND TRADEMARK OFFICE
CERTIFICATE OF CORRECTION

PATENT NO.       : 7,449,500 B2
APPLICATION NO.  : 10/865665
DATED            : November 11, 2008
INVENTOR(S)      : Madaras et al.

It is certified that error appears in the above-identified patent and that said Letters Patent is hereby corrected as shown below:

Columns 35 and 36, delete Structure 5, and insert correct Structure 5:

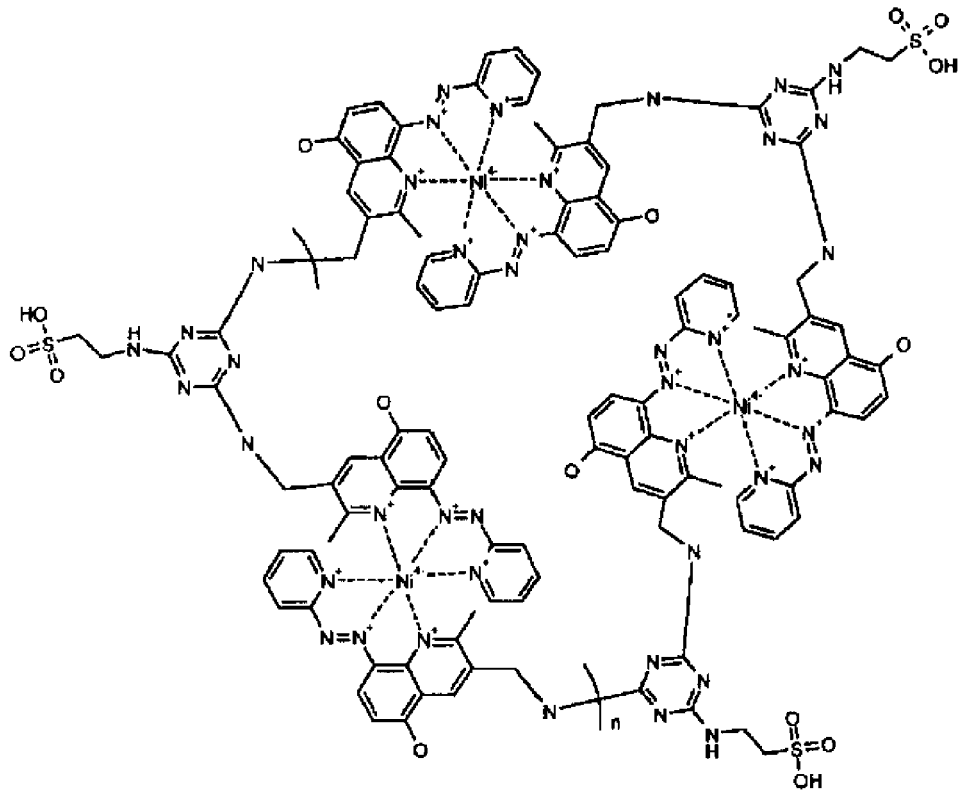

--                                                                                                      --.

UNITED STATES PATENT AND TRADEMARK OFFICE
CERTIFICATE OF CORRECTION

PATENT NO.       : 7,449,500 B2                                    Page 4 of 8
APPLICATION NO.  : 10/865665
DATED            : November 11, 2008
INVENTOR(S)      : Madaras et al.

It is certified that error appears in the above-identified patent and that said Letters Patent is hereby corrected as shown below:

Columns 37 and 38, delete Structure 6, and insert correct Structure 6:

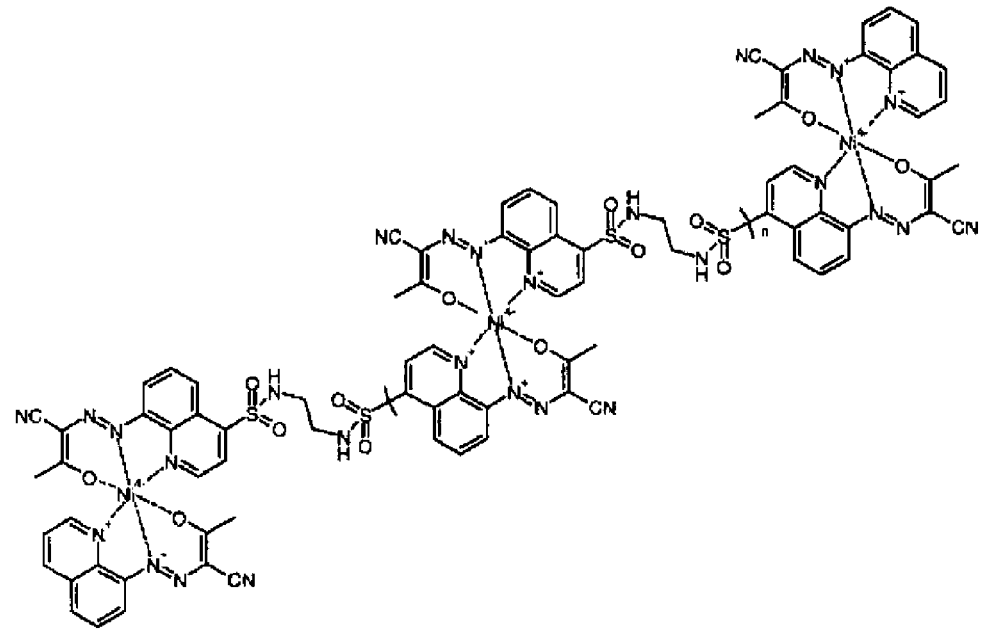

--                                                                       --.

UNITED STATES PATENT AND TRADEMARK OFFICE
CERTIFICATE OF CORRECTION

PATENT NO.       : 7,449,500 B2                              Page 5 of 8
APPLICATION NO.  : 10/865665
DATED            : November 11, 2008
INVENTOR(S)      : Madaras et al.

It is certified that error appears in the above-identified patent and that said Letters Patent is hereby corrected as shown below:

Columns 39 and 40, delete Structure 7, and insert correct Structure 7:

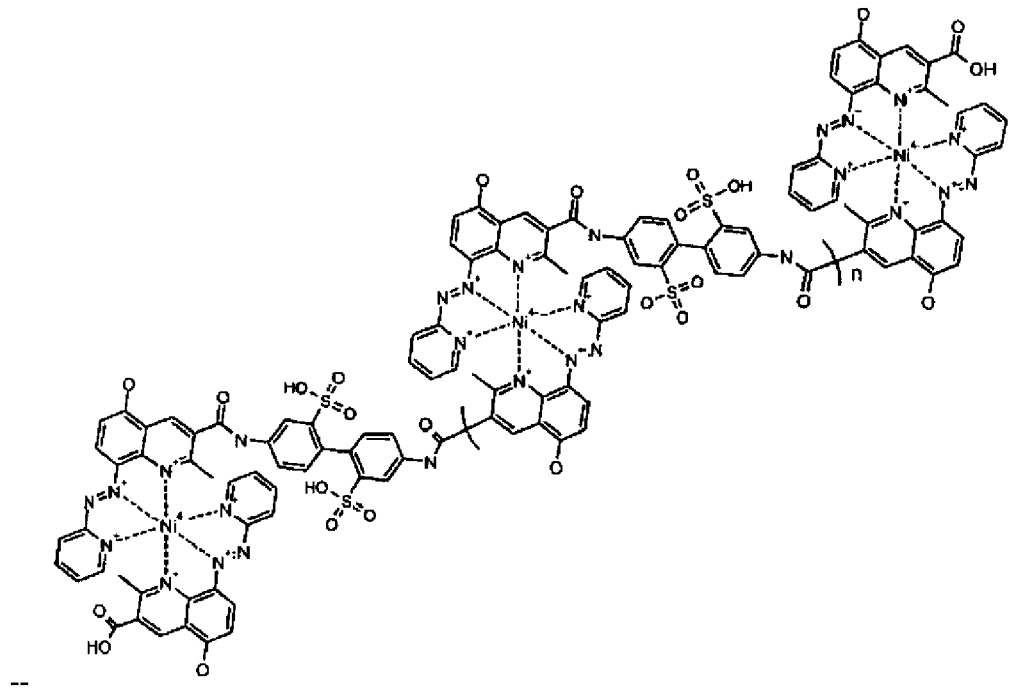

-- --.

UNITED STATES PATENT AND TRADEMARK OFFICE
CERTIFICATE OF CORRECTION

PATENT NO. : 7,449,500 B2  
APPLICATION NO. : 10/865665  
DATED : November 11, 2008  
INVENTOR(S) : Madaras et al.

It is certified that error appears in the above-identified patent and that said Letters Patent is hereby corrected as shown below:

Columns 41 and 42, delete Structure 10, and insert correct Structure 10:

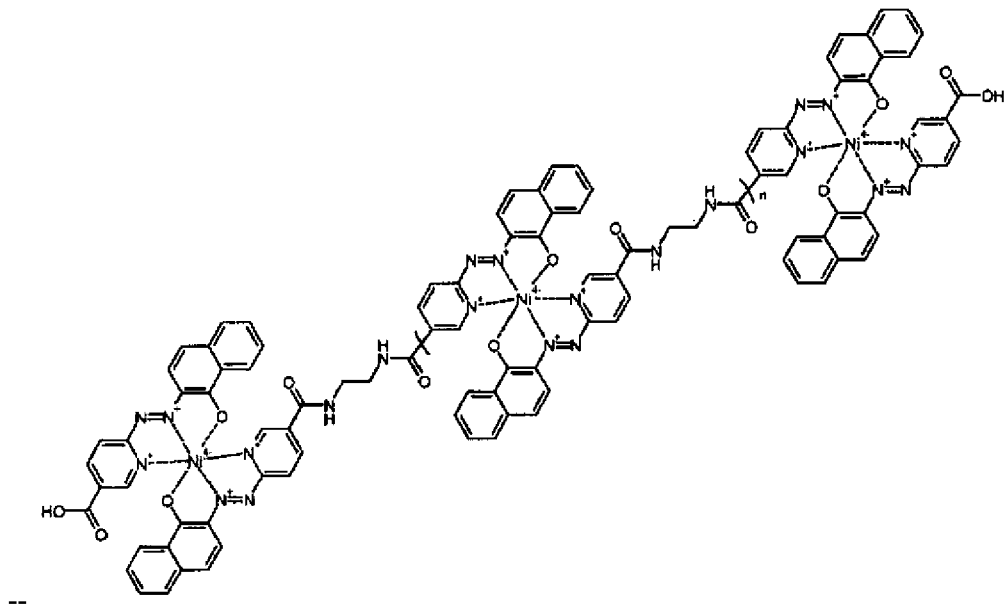

-- --.

UNITED STATES PATENT AND TRADEMARK OFFICE
CERTIFICATE OF CORRECTION

PATENT NO. : 7,449,500 B2
APPLICATION NO. : 10/865665
DATED : November 11, 2008
INVENTOR(S) : Madaras et al.

It is certified that error appears in the above-identified patent and that said Letters Patent is hereby corrected as shown below:

Columns 43 and 44, delete Structure 11, and insert correct Structure 11:

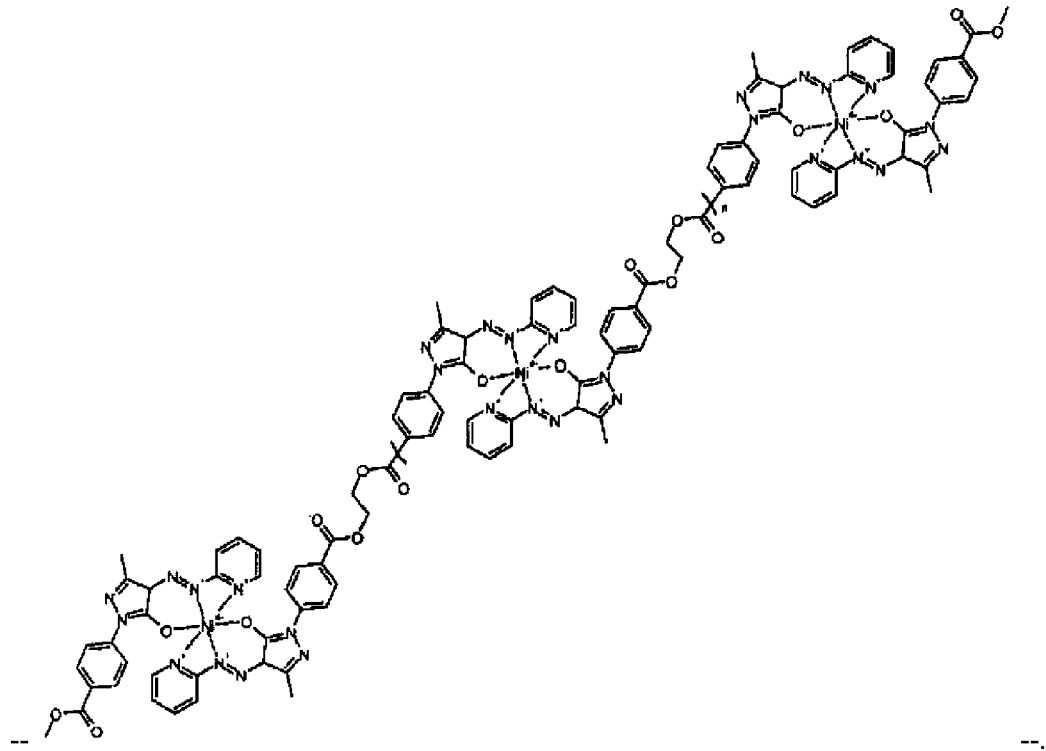

--.

UNITED STATES PATENT AND TRADEMARK OFFICE
CERTIFICATE OF CORRECTION

PATENT NO. : 7,449,500 B2  Page 8 of 8
APPLICATION NO. : 10/865665
DATED : November 11, 2008
INVENTOR(S) : Madaras et al.

It is certified that error appears in the above-identified patent and that said Letters Patent is hereby corrected as shown below:

Columns 43 - 46, delete Structure 12, and insert correct Structure 12:

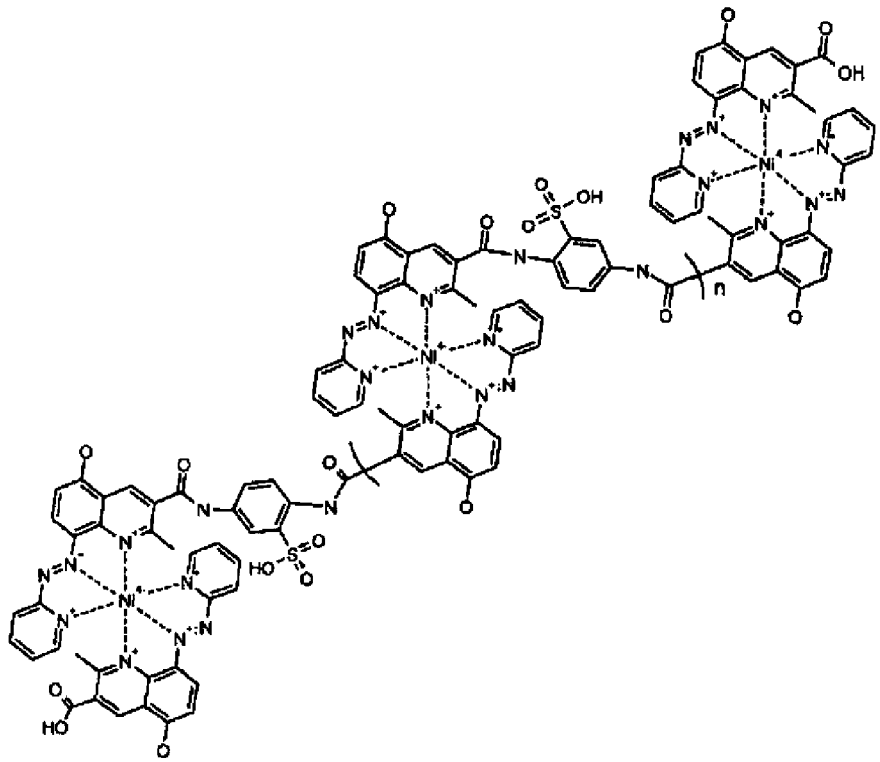

-- wherein n = 0-200.   --.

Signed and Sealed this

Twenty-sixth Day of May, 2009

JOHN DOLL
*Acting Director of the United States Patent and Trademark Office*